(12) United States Patent
Senda

(10) Patent No.: US 8,339,357 B2
(45) Date of Patent: Dec. 25, 2012

(54) CHARACTER INPUT SYSTEM, CHARACTER INPUT METHOD AND CHARACTER INPUT PROGRAM

(75) Inventor: Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 762 days.

(21) Appl. No.: 12/161,564

(22) PCT Filed: Jun. 30, 2006

(86) PCT No.: PCT/JP2006/313532
§ 371 (c)(1),
(2), (4) Date: Jul. 19, 2008

(87) PCT Pub. No.: WO2007/083406
PCT Pub. Date: Jul. 26, 2007

(65) Prior Publication Data
US 2010/0231503 A1  Sep. 16, 2010

(30) Foreign Application Priority Data
Jan. 20, 2006 (JP) .................................. 2006-012297

(51) Int. Cl.
*G09G 5/00* (2006.01)
(52) U.S. Cl. .......... 345/156; 345/171; 341/28; 708/144; 708/145

(58) Field of Classification Search .......... 345/156–176; 341/28; 708/144–146
See application file for complete search history.

(56) References Cited

U.S. PATENT DOCUMENTS

| 6,043,761 A * | 3/2000 | Burrell, IV | 341/23 |
| 2003/0063688 A1* | 4/2003 | Noda | 375/308 |
| 2003/0165048 A1* | 9/2003 | Bamji et al. | 361/681 |
| 2004/0080487 A1* | 4/2004 | Griffin et al. | 345/156 |

FOREIGN PATENT DOCUMENTS

| JP | 200578251 A | 3/2005 |
| JP | 2005316961 A | 11/2005 |

\* cited by examiner

*Primary Examiner* — Amare Mengistu
*Assistant Examiner* — Premal Patel
(74) *Attorney, Agent, or Firm* — Sughrue Mion, PLLC

(57) ABSTRACT

The grouping unit assigns an m-digit value expressed by an n-ary notation to each input candidate character one-for-one to classify the respective input candidate characters into n groups on a basis of each of the m digits. The group displaying unit causes the display device to display, in the lump on a group basis, the input candidate characters classified on a digit basis. Among n selection keys corresponding to the respective groups, the input device has one key operated by a user to output information indicating which selection key is operated (information indicative of a selection key operated) to the character structuring unit. The character structuring unit determines a character according to information input from the input device.

15 Claims, 17 Drawing Sheets

FIG. 2

INPUT TARGETS: 62 CHARACTERS OF A~Z, A~Z AND 0~9
THE NUMBER OF KEYS: FOUR OF 「UP」,「DOWN」,「LEFT」 AND 「RIGHT」

| CHARACTER | A | B | C | D | E | F |
|---|---|---|---|---|---|---|
| QUATERNARY NUMBER | 1 | 1 | 1 | 1 | 1 | 1 |
|  | 2 | 2 | 3 | 3 | 3 | 3 |
|  | 2 | 3 | 0 | 1 | 2 | 3 |

...

| CHARACTER | a | b | c | d | e | f |
|---|---|---|---|---|---|---|
| QUATERNARY NUMBER | 0 | 0 | 0 | 0 | 0 | 0 |
|  | 0 | 0 | 0 | 0 | 1 | 1 |
|  | 0 | 1 | 2 | 3 | 0 | 1 |

...

| 0 | 1 | 2 | 3 | 4 | 5 | 6 | 7 | 8 | 9 |
|---|---|---|---|---|---|---|---|---|---|
| 3 | 3 | 3 | 3 | 3 | 3 | 3 | 3 | 3 | 3 |
| 1 | 1 | 1 | 1 | 2 | 2 | 2 | 2 | 3 | 3 |
| 0 | 1 | 2 | 3 | 0 | 1 | 2 | 3 | 0 | 1 |

FIG. 11
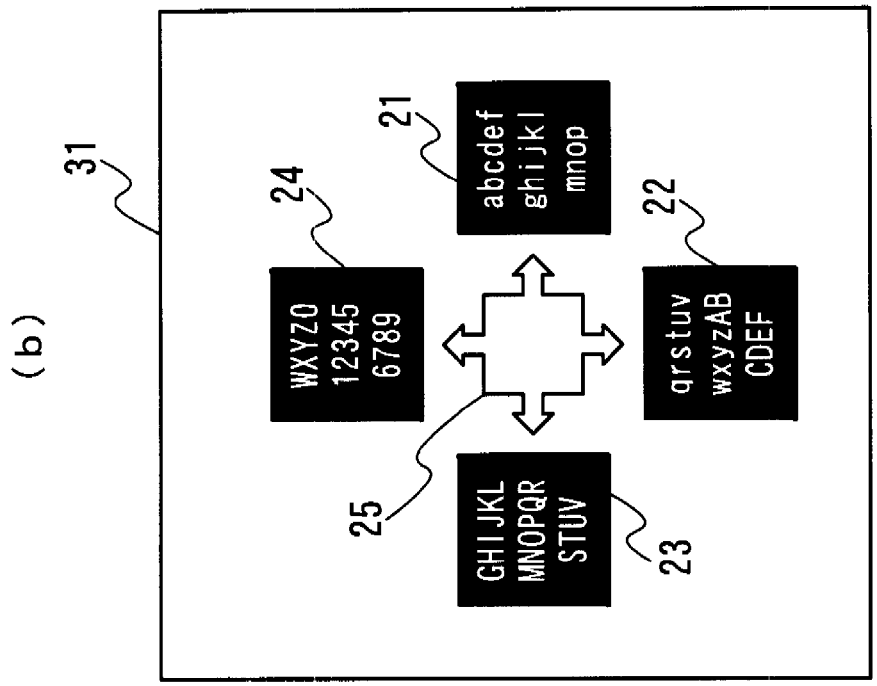
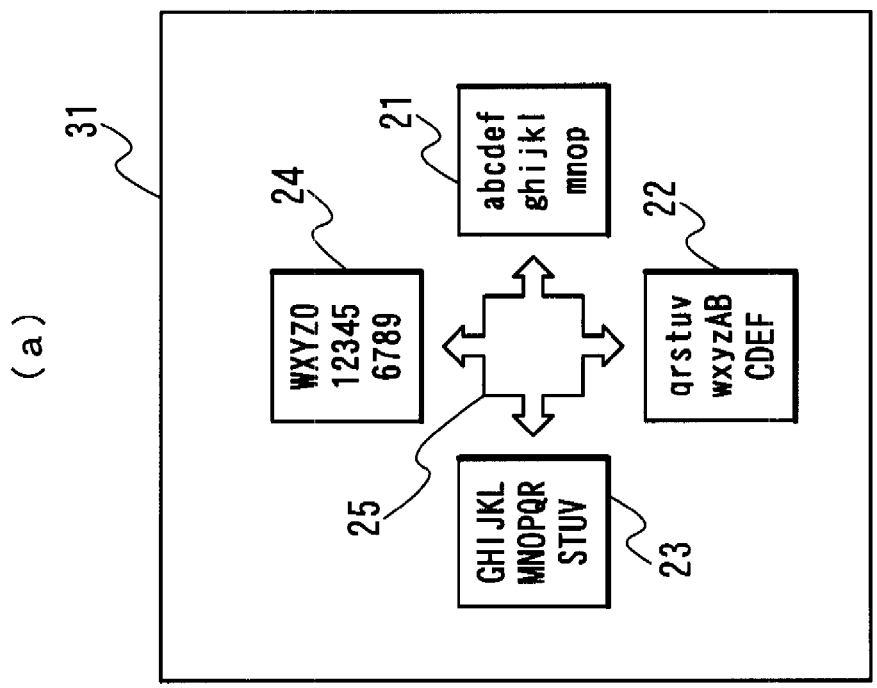

FIG. 12

| CHARACTER | a | b | c | d | e | f | ... | A | B | C | D | E | F | ... | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|
| CS | 0 | 1 | 2 | 3 | 1 | 2 | | 1 | 2 | 0 | 1 | 2 | 3 | | 0 | 1 | 2 | 3 | 1 | 2 | 3 | 0 | 2 | 3 |
| QUATERNARY NUMBER | 0 | 0 | 0 | 0 | 0 | 0 | | 1 | 1 | 1 | 1 | 1 | 1 | | 3 | 3 | 3 | 3 | 3 | 3 | 3 | 3 | 3 | 3 |
| | 0 | 0 | 0 | 0 | 1 | 0 | | 2 | 2 | 3 | 3 | 3 | 3 | | 1 | 1 | 1 | 1 | 2 | 2 | 2 | 2 | 3 | 3 |
| | 0 | 1 | 2 | 3 | 0 | 1 | | 2 | 3 | 0 | 1 | 2 | 3 | | 0 | 1 | 2 | 3 | 0 | 1 | 2 | 3 | 0 | 1 |

FIG. 15
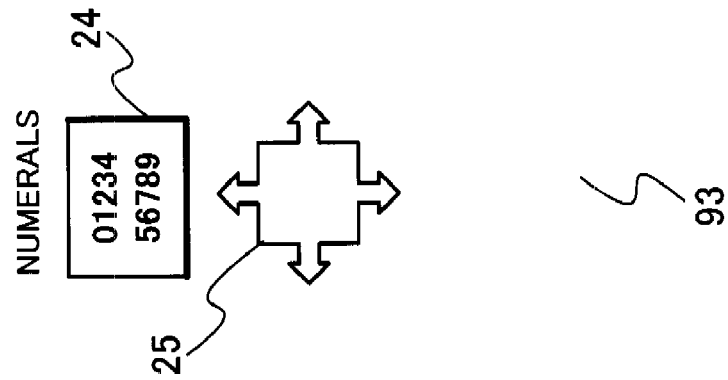
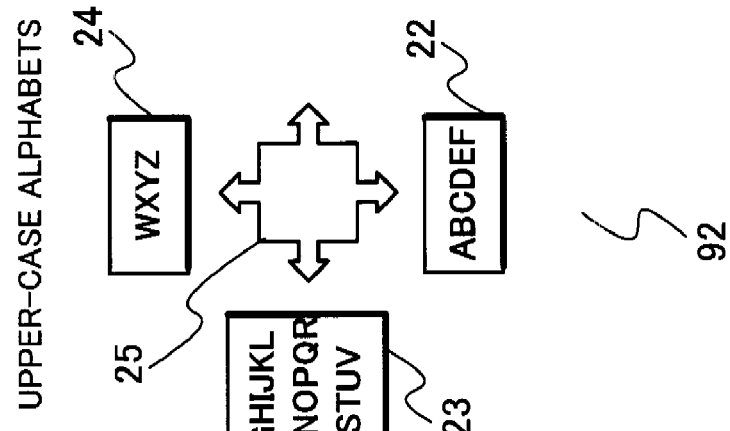
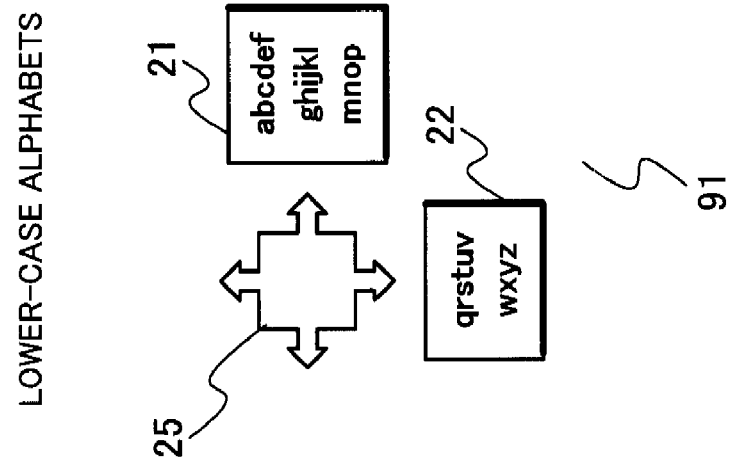

CHARACTER INPUT SYSTEM, CHARACTER INPUT METHOD AND CHARACTER INPUT PROGRAM

TECHNICAL FIELD

The present invention relates to a character input system, a character input method and a character input program and, more particularly, a character input system, a character input method and a character input program which enable characters and symbols to be input without allowing others than a person who executes input operation to know the characters and the symbols.

BACKGROUND ART

There are cases where characters should be input to a portable apparatus such as a cellular phone, a terminal device with a display disposed at a bank or a round-the-clock store (e.g. ATM (Automatic Teller's Machine) and a terminal at a kiosk), a television receiver (hereinafter referred to as a Web television receiver) connectable to the Internet to display a Web page and the like. In this case, a person who executes character input operation (hereinafter referred to as a user) is in some cases demanded to input characters without the others' knowing the input characters. Relevant case is, for example, a case where secret information such as a password is input.

In general, for preventing others than a user from knowing an input character, the input character is replaced by a blank (e.g. "*") and displayed. Such a character input system is, however, premised on that a key for use in character input and a character correspond one-for-one to each other. In a case of a remote controller of a Web television receiver or a cellular phone having a small number of keys, accordingly, kinds of characters which can be input are limited. Characters which can be input are limited to numerals, for example. With an input device having none of number keys (e.g. an input device having a direction indicator key such as up, down, right and left but not a number key), for example, characters such as password themselves can not be input.

Known as a character input method is a method using a soft keyboard by which with a virtual keyboard displayed on a screen, keys are clicked by a mouse. Also known is a method of switching a character on a cellular phone every time a number key is pressed and determining a character according to the number of presses of the number key.

Among systems proposed is a character input system for inputting a character without having a third person know a character to be input (e.g. see Literature 1 and Literature 2). Recited in Literature 1 is the character input system in which with two-dimensionally aligned character strings displayed, a user operates a button for selecting a column and a button for selecting a row to determine one character as an input character. Recited in Literature 2 is the character input device in which with a focus successively moved in a predetermined cycle along an input candidate character string displayed on a display screen, a user operates a button or the like when the focus moves to a character that the user wants to input to select the input character. In the character input device recited in Literature 2, when inputting one character, the focus is moved at least once on an individual character of the input candidate character string.

Literature 1: Japanese Patent Laying Open No. 2005-316961 (paragraphs 0030-0035, FIG. 2, FIG. 4).

Literature 2: Japanese Patent Laying Open No. 2005-78251 (paragraphs 0016-0029).

With the character input system recited in Literature 1, one character is determined by operating a button for selecting a column and a button for selecting a row. When increasing the number of characters as input candidates, however, the number of columns and rows of two-dimensionally aligned character strings is increased. Although in the character input system illustrated in Literature 1, for example, upper-case letters are excluded from input candidates (see FIG. 4 in Literature 1), the number of the columns and the rows of the character strings will be large when upper-case letters are included in input candidates. Then, the number of buttons for selecting the columns and buttons for selecting the rows will be accordingly increased. As a result, the system has a difficulty in application to a case where the number of keys is small.

In the character input device recited in Literature 2, when inputting one character, the focus is moved onto an individual character of an input candidate character string at least once. Therefore, the larger the number of kinds of characters as input candidates is, the more time is required for inputting one character, thereby making efficient (in other words, quick) character input difficult. When a focus moving speed is increased for speeding up character input, because time when the focus remains at one input candidate character will be shortened, erroneous input is more likely to occur. In addition, because for enhancing secrecy, it is not displayed such as at which selection candidate character the focus remains when the button is pressed, a user is not allowed to notice erroneous input even he/she makes it.

On the other hand, with character input by a soft keyboard and a character input method in which a character is determined according to the number of times of pressing of a number key, when a third person sees a display screen, input characters will be known to the third person.

An exemplary object of the present invention is to provide a character input system, a character input method and a character input program which enable various kinds of characters and symbols to be efficiently input without having others know them even when the number of keys is small.

SUMMARY

According to a first exemplary aspect of the invention, a character input system, includes an input unit including an n number of selection units for selecting any group among groups of input candidate characters which are characters or symbols as an input candidate, a grouping unit for assigning an m-digit n-ary number satisfying $X \leq n^m$ when the number of input candidate characters is set to be X to each input candidate character one-for-one to classify the respective input candidate characters into n groups on a basis of each of m digits, a display unit for displaying, on a basis of each of m digits, the n groups of the respective input candidate characters classified, and a character specifying unit for specifying a value which each digit of an n-ary number can assume and which corresponds to the selection unit operated by a user and specifying one input candidate character according to an m-digit n-ary number determined by m times of operation of the selection unit.

According to a second exemplary aspect of the invention, a character input system, includes an input unit including an n number of selection units for selecting any group among groups of input candidate characters which are characters or symbols as an input candidate, a grouping unit for assigning an m-digit n-ary number satisfying $X \leq n^m$ when the number of input candidate characters is set to be X to each input candidate character one-for-one to classify the respective input candidate characters into n groups on a basis of each of m digits, a display unit for displaying, on a basis of each of m digits, the n groups of the respective input candidate characters classified, and a character specifying unit for specifying n-ary numbers of the X input candidate characters on a digit basis according to X times of operation of the selection unit that specifies a value which each digit of an n-ary number can assume and specifying X input candidate characters determined by m times of repetition of specification on a digit basis.

According to a third exemplary aspect of the invention, a character input system connected to a terminal device through a communication network, the device having an input unit including an n number of selection units for selecting any group among groups of input candidate characters which are characters or symbols as an input candidate and a display device for displaying an image, includes a grouping unit for assigning an m-digit n-ary number satisfying $X \leq n^m$ when the number of input candidate characters is set to be X to each input candidate character one-for-one to classify the respective input candidate characters into n groups on a basis of each of m digits, a display unit for causing the display device to display, on a basis of each of m digits, the n groups of the respective input candidate characters classified, and a character specifying unit for specifying a value which each digit of an n-ary number can assume and which corresponds to the selection unit operated by a user and specifying one input candidate character according to an m-digit n-ary number determined by m times of operation of the selection unit.

According to a fourth exemplary aspect of the invention, a character input method using an input unit including an n number of selection units, wherein a grouping unit assigns an m-digit n-ary number satisfying $X \leq n^m$ when the number of input candidate characters which are characters or symbols as an input candidate is set to be X to each input candidate character one-for-one to classify the respective input candidate characters into n groups on a basis of each of m digits, a display unit displays, on a basis of each of the m digit, the n groups of the respective input candidate characters classified, and a character specifying unit specifies a value which each digit of an n-ary number can assume and which corresponds to the selection unit operated by a user and specifies one input candidate character according to an m-digit n-ary number determined by m times of operation of the selection unit.

According to a fifth exemplary aspect of the invention, a character input program for causing a computer integrally or separately provided with an input unit including an n number of selection units to execute:

grouping processing of assigning an m-digit n-ary number satisfying $X \leq n^m$ when the number of input candidate characters which are characters or symbols as an input candidate is set to be X to each input candidate character one-for-one to classify the respective input candidate characters into n groups on a basis of each of m digits, displaying processing of displaying, on a basis of each of the m digit, the n groups of the respective input candidate characters classified, and character specifying processing of specifying a value which each digit of an n-ary number can assume and which corresponds to the selection unit operated by a user and specifying one input candidate character according to an m-digit n-ary number determined by m times of operation of the selection unit.

According to the present invention, even when the number of selection units is small, various kinds of characters and symbols can be input efficiently without having others know them.

BRIEF DESCRIPTION OF THE DRAWINGS

FIG. 2 is a diagram for use in explaining an example in which to a character as an input candidate, values of three digits of a quaternary number is assigned;

FIG. 11 is a diagram for use in explaining an example of switching of a background color;

FIG. 12 is a diagram for use in explaining an example of an n-ary number including a redundant digit;

FIG. 15 is a diagram for use in explaining a display example in a case where an input candidate character belonging to each group is displayed in a different region on a basis of a kind of character;

EXEMPLARY EMBODIMENT

In the following, modes of implementation of the present invention will be described with reference to the drawings. The character input system according to the present invention is applicable not only to character input but also to symbol input. Characters may include a control character. In other words, the character input system according to the present invention is also applicable to input of a control character. In the following, description will be made of a character input system applied to character input for the simplification of description. Also for the simplification of description, description will be made of a case where characters as an input candidate (characters to be input) are numerals ("0~"9), lower-case alphabets ("a"~"z") and upper-case alphabets ("A"~"Z").

First Mode of Implementation

Figure 1:
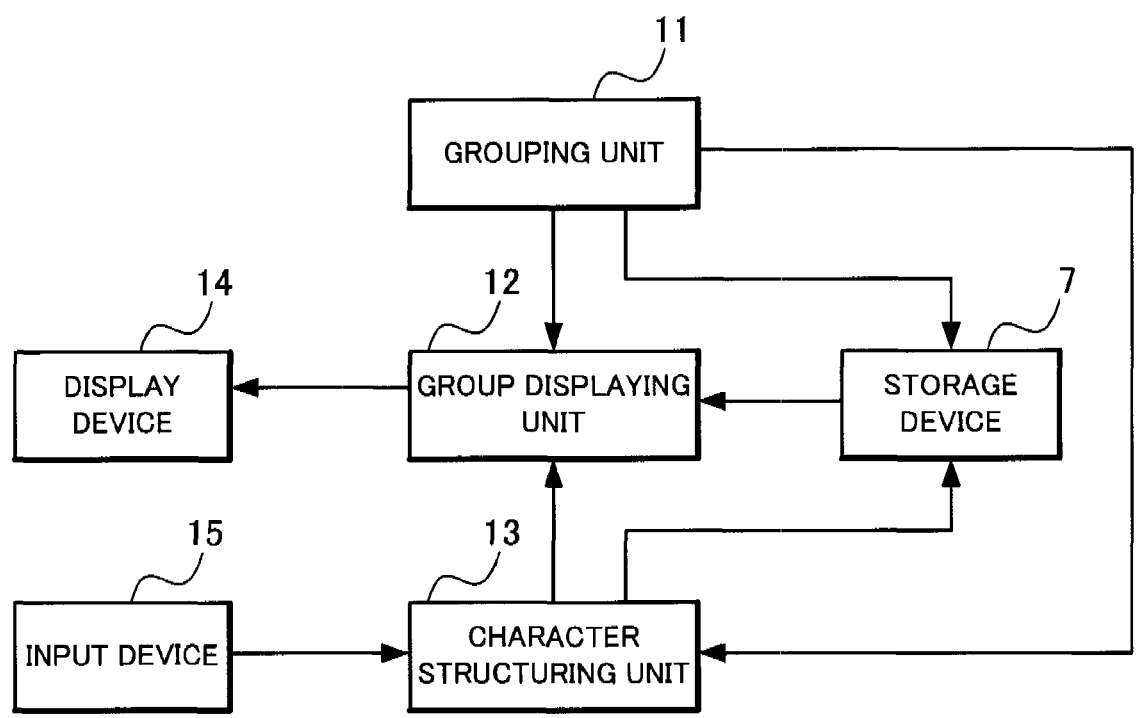
FIG. 1 is a block diagram showing a first mode of implementation of a character input system according to the present invention.

FIG. 1 is a block diagram showing a first mode of implementation of the character input system according to the present invention. Here, description will be made of a character input system in which an input character is determined one by one as an example.

As shown in FIG. 1, the character input system according to the first mode of implantation comprises a grouping unit 11, a group displaying unit 12, a character structuring unit 13, a display device 14 and an input device 15. The character input system also comprises a storage device 7 for storing information.

The display device 14 is a display device for displaying an image.

The input device 15, which has a key (button) operated by a user, is a device for outputting information indicating which key is operated. Among keys that the input device 15 has, a key for use in selecting a group of input candidate characters will be denoted as a selection key. Other than the selection key, the input device 15 has a determination key for instructing on output of information indicating which selection key is operated. When a user presses the selection key and then the determination key, the input device 15 outputs information indicating which selection key is operated. Without having the determination key, when a user presses one selection key, the input device 15 may output information indicating that the selection key is operated. The input device 15 may be provided integral with the character input system. Alternatively, the input device 15 may be a remote controller which is provided separately from other components. It is possible, for example, to provide the groping unit 11, the group displaying unit 12, the character structuring unit 13 and the display unit 14 in a Web television receiver and the input device 15 as a remote controller of the Web television receiver. When the input device 15 is a remote controller, it is only necessary to transmit information indicating which selection key is operated by, for example, infrared communication or the like.

The grouping unit 11 one-for-one assigns an m-digit value expressed by an n-ary notation to each character as an input candidate. Here, n represents the number of selection keys that the input device 15 has. m, which is an integer, represents the number of digits which can be assigned one-for-one to each of characters (which may include a symbol and a control character) as input candidates. With the number of the respective characters (which may include a symbol and a control character) as input candidates represented as X, m only needs to satisfy $X \leq n^m$. Here, the minimum value of m satisfying $X \leq n^m$ may be adopted as the number of digits. Alternatively, a value obtained by adding a redundant number of digits (e.g. 1) to the minimum value of m satisfying $X \leq n^m$ may be adopted as the number of digits. Here, description will be made of a case, as an example, where the minimum value of m satisfying $X \leq n^m$ is used as the number of digits.

Assume, for example, that the number of the selection keys that the input device 15 has is four. Since the present mode of implementation is premised on, as an example, a case where characters as input candidates are numerals ("0~"9), lower-case alphabets ("a"~"z") and upper-case alphabets ("A"~"Z"), the number of characters as input candidates is 62. Accordingly, the minimum value of m satisfying $62 \leq 4^m$ is 3. In this case, therefore, the grouping unit 11 one-for-one assigns a three-digit value expressed by a quaternary notation to each character as an input candidate.

One example of such a manner of assignment of a value to each character will be described. To each character as an input candidate, the grouping unit 11 assigns 0, 1, 2, . . . and a value obtained by adding one to the values starting at 0 as the first value. Then, the grouping unit 11 converts the value assigned to each character into an m-digit n-ary number. This conversion will be as follows. More specifically, the grouping unit 11 divides the assigned value with the addition of 1 by n to calculate a quotient and a remainder. The grouping unit 11 takes the remainder as a value of the lowest place digit among the m digits. Similarly, the grouping unit 11 divides the quotient by n to obtain a quotient and a remainder. The grouping unit 11 takes the remainder as a value of the second-lowest place digit. The grouping unit 11 repeats the same calculation until obtaining a value of the m-th lowest place digit (the highest place digit) to determine a value of an m-digit n-ary number.

FIG. 2 is a diagram for use in explaining an example where a three-digit quaternary number is assigned to a character as an input candidate. Since shown in FIG. 2 is the example in which a value of a quaternary number is assigned, the number of selection keys that the input device 15 has is assumed to be four. The example shown in FIG. 2 is a case where the grouping unit 11 assigns the values from 0 to 61 (for the purpose of convenience, they are denoted by a decimal notation here) to the lower-case alphabets ("a"~"z"), the upper-case alphabets ("A"~"Z") and the numerals ("0"~"9") in this order and the respective values are converted into quaternary numbers. Accordingly, assigned to the first character "a" is "000" which is converted from 0 of the decimal notation into a three-digit quaternary number. Assigned to the last character "9" is "331" which is converted from 61 of the decimal notation into a three-digit quaternary number.

As a result, the respective input candidate characters ("a"~"z", "A"~"Z" and "0"~"9") are divided into a group whose highest place digit is "0", a group whose highest place digit is "1", a group whose highest place digit is "2" and a group whose highest place digit is "3" (four groups). Similarly, the respective input candidate characters are divided into groups whose second highest place digits are "0", "1", "2" and "3", respectively (four groups). Similarly, the respective input candidate characters are divided into groups whose lowest place digits are "0", "1", "2" and "3", respectively (four groups).

Although described here is a case where a three-digit quaternary number is assigned to each input candidate character, also in a case where an m-digit n-ary number is assigned to each input candidate character, the respective input candidate characters are grouped into n groups according to a value of each digit on a digit basis. In other words, the grouping unit 11 classifies the respective input candidate characters into n groups on a basis of each of m digits by assigning m-digit values expressed by the n-ary notation to the respective input candidate characters one-for-one. Since n represents the number of the selection keys, the number of groups for each digit is the same as the number of the selection keys.

The grouping unit 11 causes the storage device 7 to store information indicative of a correspondence relationship between each input candidate character and an m-digit n-ary number assigned to each input candidate character.

Described in the above example is a case where values starting at 0 are sequentially assigned to the respective input candidate characters, and they are converted into m-digit n-ary numbers to assign m-digit n-ary numbers to the respective input candidate characters. This assignment manner is by way of example only and as long as the respective input candidate characters and m-digit n-ary numbers have a one-for-one correspondence relationship, m-digit n-ary numbers may be assigned by other manner. Among other manners is random assignment of a value to each input candidate character. The grouping unit 11 may generate, for example, for an individual input candidate character, a random number which assumes any value of integers from 0 to $n^m-1$ (i.e. integers which can be expressed by m-digit n-ary numbers) and convert the random numbers into m-digit n-ary numbers. In this case, however, since the grouping unit 11 one-for-one assigns values of m-digit n-ary numbers to the respective input characters, the unit fails to generate the same random number for a different input candidate character.

The group displaying unit 12 puts the input candidate characters classified on a digit basis by the grouping unit 11 into the groups and causes the display device 14 to display them. In other words, the group displaying unit 12 causes the display device 14 to display the groups of the input candidate characters on a basis of each of the m digits.

Figure 3:
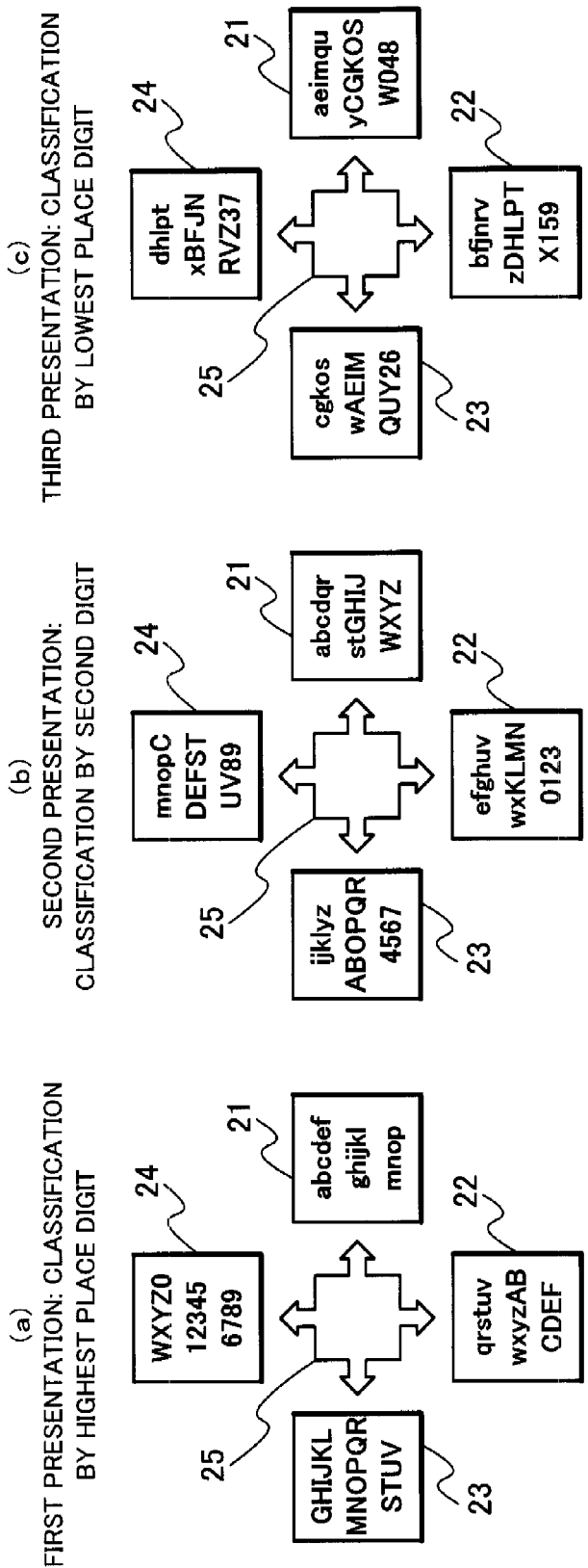
FIG. 3 is a diagram for use in explaining an example of a group to be displayed on a display device.

FIG. 3 is a diagram for use in explaining an example of groups displayed on the display device 14 by the group displaying unit 12. Shown in FIG. 3 is a case, as an example, where the grouping unit 11 assigns three-digit quaternary numbers to input candidate characters to classify the input candidate characters as shown in FIG. 2. It is accordingly assumed that the number of selection keys that the input device 15 has is four. The description will be here made assuming that the input device 15 uses four keys (not shown) which indicate up, down, left and right directions, respectively, as a selection key. These four selection keys will be denoted as an up key, a down key, a left key and a right key, respectively.

In FIG. 3, groups 21 to 24 are groups of input candidate characters whose value of one digit is "0", "1", "2" and "3", respectively. As the respective groups 21~24, the group displaying unit 12 causes input candidate characters belonging to these groups to be displayed.

The group displaying 12 unit causes the display device 14 to display the groups of the input candidate characters on a digit basis. In the present example, the group displaying unit 12 first displays the respective groups classified by a value of the highest place digit among three digits which are shown in FIG. 2 (see FIG. 3(a)). The right side group 21 shown in FIG. 3(a)) is a group of input candidate characters whose highest place digit value is "0". Similarly, the group 22 on the lower side shown in FIG. 3(a) is a group of input candidate characters whose highest place digit value is "1". The left side group 23 shown in FIG. 3(a) is a group of input candidate characters whose highest place digit value is "2". The group 24 on the upper side shown in FIG. 3(a) is a group of input candidate characters whose highest place digit value is "3". The example shown in FIG. 3 is a case where a graphic 25 is also displayed by the group displaying unit 12 which is indicative of a correspondence relationship between the respective groups and the four selection keys (up key, down key, left key and right key). The graphic 25 indicates that the groups 21, 22, 23 and 24 correspond to the right key, the down key, the left key and the up key, respectively.

When the display illustrated in FIG. 3(a) is made, the user presses the selection key corresponding to a group to which a desired character (character that the user intends to input) belongs. Then, the input device 15 outputs information indicating which selection key is operated to the character structuring unit 13. Upon input of the information, the character structuring unit 13 outputs information which designates a subsequent digit (a second digit next to the highest place digit) to the group displaying unit 12. Upon input of the information, the group displaying unit 12 displays each group classified by a second digit value (see FIG. 3(b)). The group 21 on the right side shown in FIG. 3(b) is a group of input candidate characters whose second digit value is "0". The group 22 on the lower side shown in FIG. 3(b) is a group of input candidate characters whose second digit value is "1". The group 23 on the left side shown in FIG. 3(b) is a group of input candidate characters whose second digit value is "2". The group 24 on the upper side shown in FIG. 3(b) is a group of input candidate characters whose second digit value is "3".

Also when the example illustrated in FIG. 3(b) is displayed, the user presses the selection key corresponding to a group to which the desired character belongs. Then, similarly to the above-described case, information designating a subsequent digit (the lowest place digit here) is input to the group displaying unit 12. Then, the group displaying unit 12 displays each group classified by a value of the lowest place digit (see FIG. 3(c)). The group 21 on the right side shown in FIG. 3(c) is a group of input candidate characters whose lowest place digit value is "0". The group 22 on the lower side shown in FIG. 3(c) is a group of input candidate characters whose lowest place digit value is "1". The group 23 on the left side shown in FIG. 3(c) is a group of input candidate characters whose lowest place digit value is "2". The group 24 on the upper side shown in FIG. 3(c) is a group of input candidate characters whose lowest place digit value is "3". Also when the example shown in FIG. 3(c) is displayed, the user presses the selection key corresponding to a group to which the desired character belongs.

At the time of switching display from FIG. 3(a) to FIG. 3(b) and from FIG. 3(b) to FIG. 3(c), animation may be made such that each input candidate character makes parallel movement to a subsequent display position. Thus, noting movement of an input candidate character saves labor of searching it from the entire part each time.

The character structuring unit 13 specifies a user's desired character from among input candidate characters based on information indicative of which selection key is operated (which information is input through the input unit 15). Each selection key one-for-one corresponds to each group displayed by the group displaying unit 12. Then, each group one-for-one corresponds to each value used in an individual one of m digits for expressing an n-ary number. Each selection key accordingly one-for-one corresponds to each value used in an individual one of m digits for expressing an n-ary number. In the following, the description will be made assuming that the group displaying unit 12 displays the example shown in FIG. 3 and the input device 15 has a right key, a down key, a left key and an up key which are determined to correspond to "0", "1", "2" and "3", respectively. Upon input of the information indicating which selection key is operated through the input device 15, the character structuring unit 13 causes the storage device 7 to store a value corresponding to the selection key. The unit also outputs information designating a digit to the group displaying unit 12. With the information input indicating which selection key is operated with respect to m digits (i.e. m times), after causing as many values corresponding to the selection keys as m to be stored in the storage device 7, the character structuring unit 13 specifies a character corresponding to an m-digit n-ary number determined by the respective values. Information indicative of a correspondence relationship between each input candidate character and an m-digit n-ary number assigned to each input candidate character is stored in the storage device 7 by the grouping unit 11. The character structuring unit 13 only needs to refer to the information to specify a character corresponding to the m-digit n-ary number. Characters specified by the character structuring unit 13 will not be displayed on the display device 14.

The grouping unit 11, the group displaying unit 12, the character structuring unit 13 are realized, for example, by a CPU operable according to a program (character input program). The CPU is provided, for example, in a portable apparatus such as a cellular phone, a terminal device with a display, a Web television receiver or the like. The program is stored in the storage device in advance. The character structuring unit 13 (CPU) only needs to handle a specified character as a character input to a potable apparatus, a terminal device with a display, a Web television receiver or the like. When the character structuring unit 13 is a CPU of a portable apparatus, for example, the character structuring unit 13 only needs to proceed with processing assuming that when specifying a character, the character is input to the portable apparatus. When the character structuring unit 13 is, for example, a CPU of a Web television receiver, the character structure unit 13 only needs to proceed with processing assuming that when specifying a character, the character is input to a text input area on a Web page.

Next, operation will be described.

Figure 4:
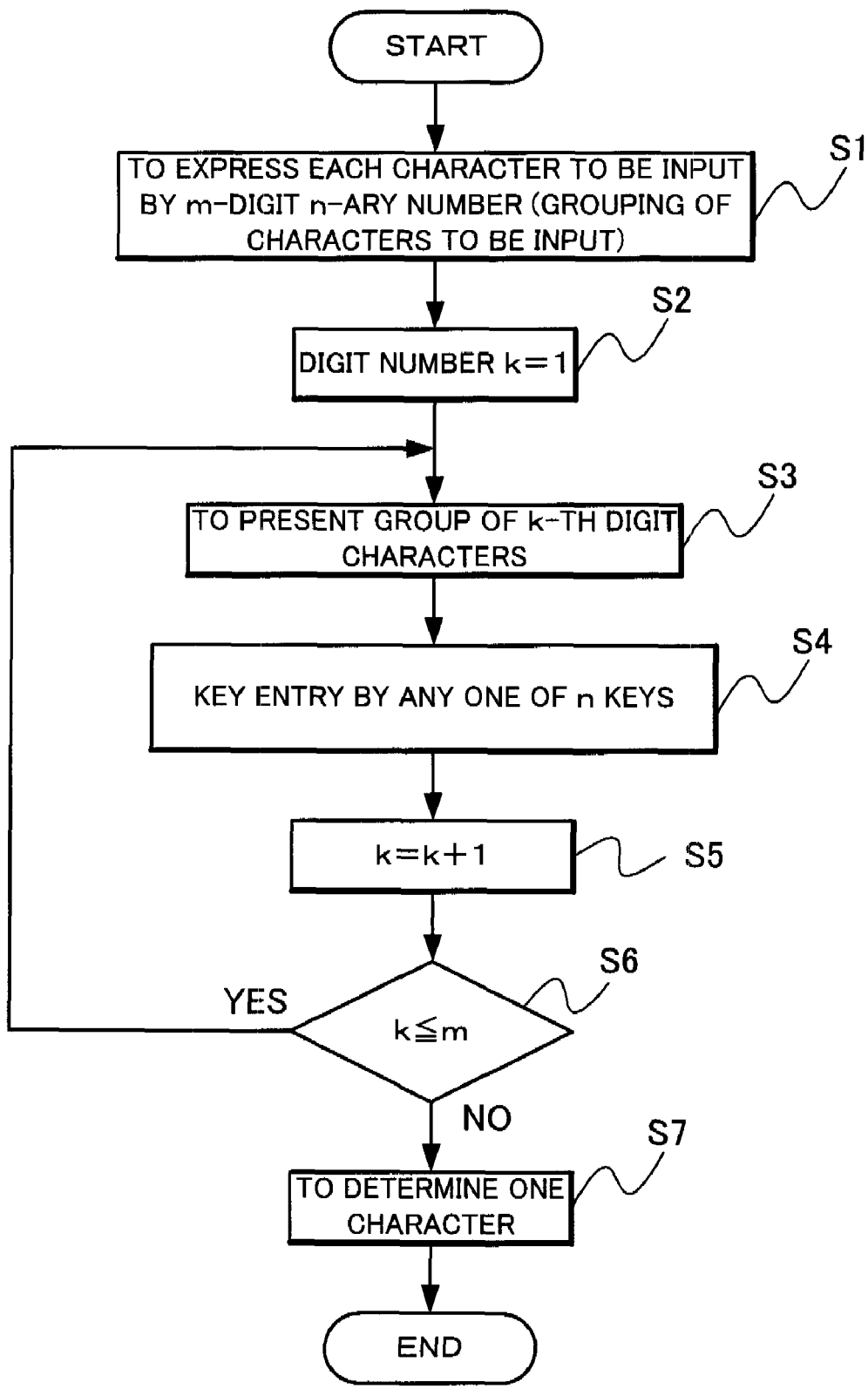
FIG. 4 is a flow chart showing an example of a processing process of the character input system according to the first mode of implementation.

FIG. 4 is a flow chart showing an example of a processing process of the character input system according to the first mode of implementation. Input candidate characters are determined in advance and a number X of input candidate characters is determined. A number n of the selection keys that the input device 15 has is also determined in advance. Then, an m-digit value whose m satisfies $X \leq n^m$ is also determined in advance. It is assumed here that among m satisfying $X \leq n^m$, a minimum integer is adopted as the number m of digits.

When specifying one character as a user's desired character, the grouping unit 11 first assigns an m-digit value expressed by the n-ary notation to each input candidate character one-for-one to classify the respective input candidate characters into n groups on a basis of each of the m digits (Step S1). At Step S1, the grouping unit 11 may assign a value obtained by adding one to the values starting at 0 as the first value to each input candidate character and converts the value into an m-digit n-ary number, thereby assigning an m-digit n-ary number to each input candidate character as is already described. In addition, the grouping unit 11 may, for example, generate a random number which assumes any value of the integers from 0 to $n^m-1$ for an individual input candidate character and convert the random number into an m-digit n-ary number, thereby assigning an m-digit n-ary number to each input candidate character. In this case, however, the grouping unit 11 refrains from generating the same random number for a different input candidate character and one-for-one assigns a value of an m-digit n-ary number to each input character.

Also at Step S1, the grouping unit 11 causes the storage device 7 to store information indicative of a correspondence relationship between each input candidate character and an m-digit n-ary number assigned to the input candidate character.

Specific example of Step S1 will be described. In a case where the input device 15 has four selection keys (right key, down key, left key and up key), input candidate characters are "a"~"z", "A"~"Z" and "0"~"9", and the number of input candidate characters is 62, the grouping unit 11 assigns a three-digit quaternary number to each of 62 input candidate characters as shown in FIG. 2, for example. Then, the grouping unit 11 causes the storage device 7 to store information indicative of a correspondence relationship between each input candidate character and an three-digit quaternary number assigned to the input candidate character. Since FIG. 2 is one example of assignment of a three-digit quaternary number, assignment of three-digit quaternary numbers to the input candidate characters is not limited to that shown in FIG. 2. When the grouping unit 11 generates a random number to assign a three-digit quaternary number, a correspondence relationship between each input candidate character and a three-digit quaternary number will differ from that shown in FIG. 2.

Subsequent to Step S1, the character structuring unit 13 sets a value of a variable k as information designating a digit at 1 (Step S2).

The variable k represents information which designates a digit for the group displaying unit 12 and the value k of 1 is assumed to designate the highest place digit. Similarly, 2, 3, 4, ... as a value of k are assumed to designate the second digit, the third digit, the fourth digit ..., respectively. With the highest place digit as the first digit, the digits are respectively assumed to be the first digit, the second digit, the third digit, the fourth digit ..., starting at the highest place digit. The value of k being m is assumed to designate the lowest place digit.

The character structuring unit 13 outputs the variable k set to be 1 (information designating the highest place digit) to the group displaying unit 12.

When the variable k is input, the group displaying unit 12 causes the display device 14 to display each of groups of input candidate characters classified by a value of the k-th digit (Step S3). In other words, at Step S3, the group displaying unit 12 presents a user each group of the input candidate characters classified by a value of the k-th digit. At Step S3, the group displaying unit 12 refers to the information indicative of a correspondence relationship between each input candidate character and an m-digit n-ary number stored in the storage device 7. Then, the group displaying unit 12 extracts an input candidate character whose k-th digit value is in common from the information stored in the storage device 7 on a k-th digit value basis. Then, the unit only needs to cause the display device 14 to display a group of input candidate characters classified by the value of the k-th digit. For example, the unit only needs to extract input candidate characters whose k-th digit values are "0", "1", "2", ..., "n−1" from the information stored in the storage device 7 and cause the display device 14 to display the input candidate characters whose k-th digit values are "0", "1", "2", ..., "n−1" in the lump on a k-th digit value basis. "n−1" is the maximum value that each digit of an n-ary number can assume.

A specific example in a case of first shift to Step S3 will be described. Since k=1 at this time, the group displaying unit 12 causes the display device 14 to display each group of input candidate characters classified by a value of the first digit (i.e. the highest place digit). Assume that at Step S1, the grouping unit 11 has assigned a three-digit quaternary number to each input candidate character as shown in FIG. 2 and caused the storage device 7 to store information indicative of a correspondence relationship between each input candidate character and a three-digit quaternary number. The group displaying unit 12 extracts an input candidate character whose highest place digit value is "0" from among the information stored in the storage device 7 (information indicative of a correspondence relationship shown in FIG. 2). As an input candidate character whose highest place digit value is "0", the group displaying unit 12 extracts a, b, c, d, e, f, g, h, j, k, l, m, n, o, p. Similarly, the group displaying unit 12 also extracts input candidate characters whose highest place digit values are "1", "2" and "3". Then, the group displaying unit 12 causes the display device 14 to display the extracted characters in the lump on a basis of the highest place digit value as shown in FIG. 3(a).

When the character input system is built in a portable apparatus, a terminal device with a display or a Web television receiver, there is a case where some image or other is already displayed on the display device 14. In this case, the group displaying device 12 only needs to display a group of input candidate characters so as to be superimposed on the image already displayed. Alternatively, the already displayed image may be reduced in size to display a group of input candidate characters in a free region.

After Step S3, the user presses a selection key corresponding to a group to which a desired character belongs among n selection keys. The input device 15 has any one of the n selection keys operated by the user to output information indicating which selection key is operated (information indicating an operated selection key) to the character structuring unit 13. The character structuring unit 13 causes the storage device 7 to store a value corresponding to a selection key indicated by the information input from the input device 15 (Step S4).

Specific example of Step S4 will be described. Assume that at Step S3, an image (a group of input candidate characters) illustrated in FIG. 3(a) is displayed. Also assume that a character that the user intends to input is the lower-case letter "s". The user confirms the image illustrated in FIG. 3(a) and presses the down key corresponding the group to which the lower-case letter "s" belongs (the group 22 in the example shown in FIG. 3(a)). The input device 15 outputs information indicating that the down key has been pressed to the character structuring unit 13, so that the character structuring unit 13 causes the storage device 7 to store the value "1" corresponding to the down key.

After Step S4, the character structuring unit 13 increments the value of the variable k by one (Step S5). In other words, the character structuring unit 13 updates the variable k (information which designates a digit) so as to designate a subsequent digit. Subsequently, the character structuring unit 13 determines whether the value of the variable k is not more than m or not (Step S6). When the value of the variable k is not more than m (y at Step S6), repeat processing of Step 3 and the following steps. When the value of the variable k is not more than m (y at Step S6), the character structuring unit 13 outputs the variable k to the group displaying unit 12 to repeat the processing of Step 3 and the following steps. When the value of the variable k is larger than m (n at Step S6), the processing shifts to Step S7.

Description will be made of a specific example of a case where the processing again shifts to Step S3 to repeat the processing of Step S3 and the following steps. When the processing shifts to Step S3 for the second time, as the value of the variable k, 2 is input to the group displaying unit 12. Accordingly, the group displaying unit 12 causes the display device 14 to display each group of input candidate characters classified by the value of the second digit. In addition, similarly to the above-described specific example of Step S3, assume that such information indicative of a correspondence relationship between each input candidate character and a three-digit quaternary number as shown in FIG. 2 is stored in the storage device 7. The group displaying unit 12 extracts an input candidate character whose second digit value is "0" from the information stored in the storage device 7 (the information indicative of the correspondence relationship shown in FIG. 2). The group displaying unit 12 extracts a, b, c, d, q, r, s, t, G, H, I, J, W, X, Y and Z as input candidate characters whose second digit value is "0". Similarly, the group displaying unit 12 also extracts input candidate characters whose second digit values are "1", "2" and "3". Then, the group displaying unit 12 causes the display device 14 to display the extracted characters in the lump on a second digit value basis as shown in FIG. 3(b) (Step S3).

Assume that a character that a user intends to input is the lower-case letter "s" similarly to the above-described specific example. The user confirms the image illustrated in FIG. 3(b) to press the right key corresponding to the group to which the lower-case letter "s" belongs (the group 21 in the example shown in FIG. 3(b)). The input device 15 outputs information indicating that the right key is operated to the character structuring unit 13, so that the character structuring unit 13 causes the storage device 7 to store the value "0" corresponding to the right key (Step S4). Subsequently, the character structuring unit 13 increments the value of the variable k by one to make k=3 (Step S5). Then, the character structuring unit 13 determines whether the value of the variable k is not more than m (3 in this example) (Step S6). Here, since k=m (y at Step S6), the character structuring unit 13 outputs the variable k to the group displaying unit 12. Then, again move to Step S3.

When moving to Step S3 for the third time, as the value of the variable k, 3 is input to the group displaying unit 12. Accordingly, the group displaying unit 12 causes the display device 14 to display each group of input candidate characters classified by a value of the third digit (the lowest place digit in this example). The group displaying unit 12 extracts an input candidate character whose third digit value is "0" from among the information stored in the storage device 7 (information indicative of a correspondence relationship shown in FIG. 2). The group displaying unit 12 extracts a, e, i, m, q, u, y, C, G, K, O, S, W, 0, 4 and 8 as an input candidate character whose third digit value is "0". Similarly, the group displaying unit 12 also extracts an input candidate character whose third digit values are "1", "2" and "3". Then, the group displaying unit 12 causes the display device 14 to display the extracted characters in the lump on a basis of the third digit value shown in FIG. 3(c) (Step S3).

The user confirms the image illustrated in FIG. 3(c) to press the left key corresponding to the group to which the lower-case letter "s" belongs (the group 23 in the example shown in FIG. 3(c)). The input device 15 outputs information indicating that the left key is operated to the character structuring unit 13, so that the character structuring unit 13 causes the storage device 7 to store the value "2" corresponding to the left key (Step S4). Subsequently, the character structuring unit 13 increments the value of the variable k by one to make k 4 (Step S5). Then, the character structuring unit 13 determines whether the value of the variable k is not more than m (3 in this example) (Step S6). Here, since k>m (n at Step S6), move to Step S7. As in the present specific example, in a case where the user presses the down key, the right key and the left key to input the lower-case letter "s" when each image shown in FIG. 3(a)~(c) is displayed, the character structuring unit 13 causes values of the respective digits, "1", "0" and "2", to be stored.

Before moving to Step S7, the processing of Step S4 is executed m times and a value equivalent to each digit of an m-digit n-ary number is stored in the storage device 7. When moving to Step S7, the character structuring unit 13 specifies a character corresponding to an m-digit n-ary number determined by the values of the respective digits which are stored in the storage device 7 every time the processing moves to Step S4 (Step S7). As a result, one character of characters desired by the user is determined. At Step S1, the grouping unit 11 causes the storage device 7 to store information indicative of a correspondence relationship between each input candidate character and an m-digit n-ary number. Accordingly, the character structuring unit 13 only needs to specify a character corresponding to an m-digit n-ary number determined by the respective digits by referring to the information at Step S7.

Specific example of Step S7 will be described. As the above-described specific example, assume that as a result of pressing of the down key, the right key and the left key of the input device 15 by the user, the character structuring unit 13 causes the storage device 7 to store values of the respective digits "1", "0" and "2". In this case, the character structuring unit 13 specifies a character corresponding to the three-digit quaternary number "102" which is determined by the values of the respective digits at Step S7. When 0, 1, 2, . . . (for the sake of convenience, they are denoted by the decimal notation here) are assigned to the respective input candidate characters "a"~"z", "A"~"Z" and "0"~"9" and the values are converted into three-digit quaternary numbers as shown in FIG. 2, the quaternary number "102" is made to correspond to the lower-case letter "s" and its correspondence relationship is stored in the storage device 7. Accordingly, the character structuring unit 13 specifies the lower-case letter "s" as a character corresponding to the quaternary number "102" by referring to the information indicative of the correspondence relationship.

As is already described, the character structuring unit 13 only needs to handle the specified character as a character input to a portable apparatus, a terminal device with a display, a Web television receiver or the like to which the present invention is applied.

For further inputting another character, the same processing (the processing illustrated in FIG. 4) should be repeated again. Accordingly, it is possible to input various character strings whose number of characters is not limited on a character basis one by one.

When the input of the character is completed, the group displaying unit 12 only needs to erase the groups of the input candidate characters and the graphic 25 shown in FIG. 3 from the screen of the display device 14 to cause an image displayed before the input of the character to be displayed.

Figure 5:
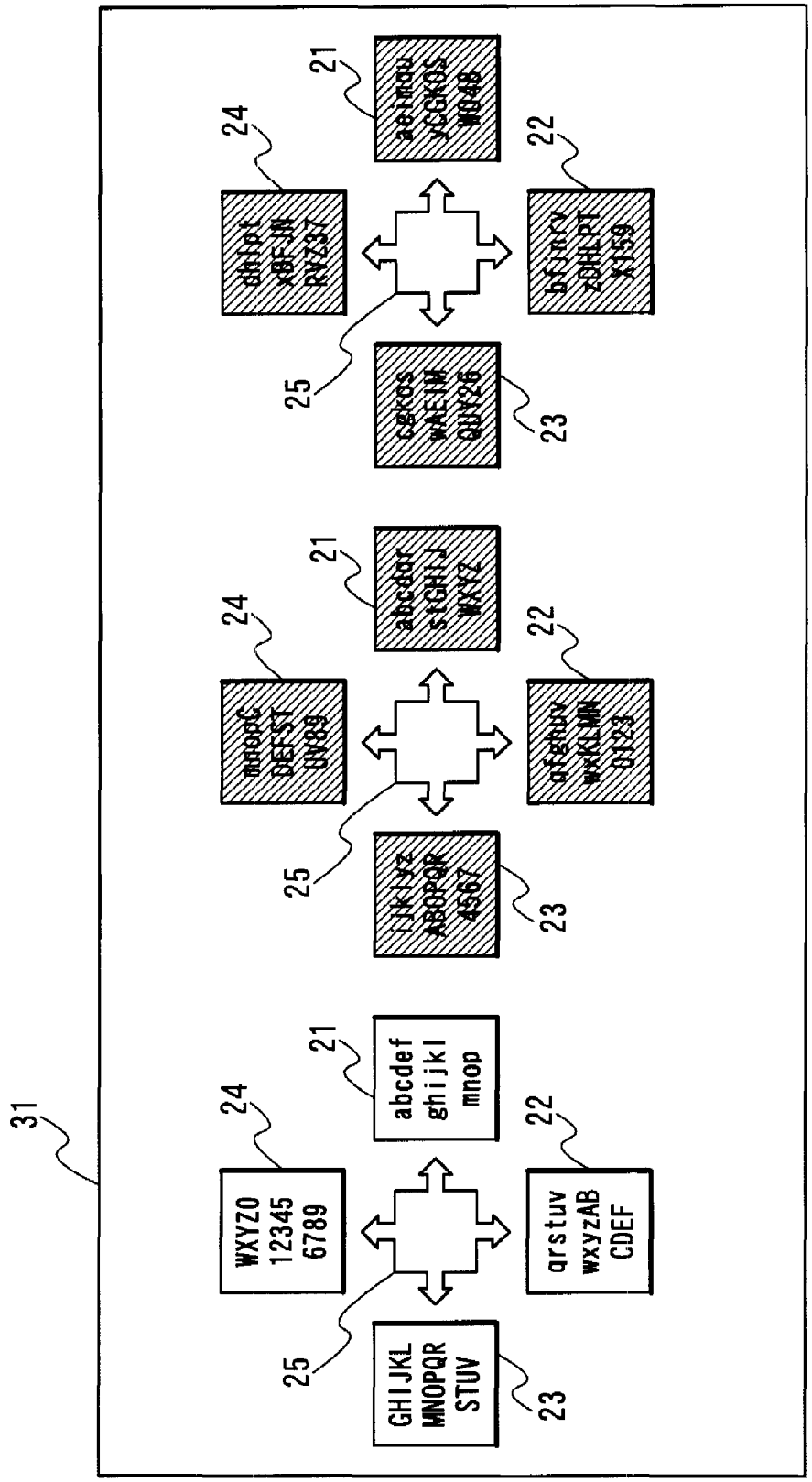
FIG. 5 is a diagram for use in explaining one example of a manner of displaying a group of input candidate characters.

Next, description will be made of an example of a display manner of displaying the respective groups of the input candidate characters classified by the value of the k-th digit (Step S3). FIG. 5 is a diagram for use in explaining one example of a manner of displaying the groups of the input candidate characters. Illustrated in FIG. 5 is a display manner of the group displaying unit 12 displaying each group of the input candidate characters classified by a value of the digit in a display region 31 of the display device 14 on a digit basis at Step S3. In the example shown in FIG. 5, the four groups 21~24 shown on the left side represent the respective groups of the input candidate characters classified by a value of the highest place digit. The four groups 21~24 illustrated at the center of FIG. 5 represent the groups of input candidate characters classified by the value of the second digit. The four groups 21~24 illustrated on the right side of FIG. 5 represent the groups of input candidate characters classified by the value of the lowest place digit. Thus, the group displaying unit 12 causes the display device 14 to display the groups for each digit. In this display manner, however, the group displaying unit 12 displays a group corresponding to a digit according to the value of k (information designating a digit) distinguishably from a group corresponding to other digit. The example illustrated in FIG. 5 shows a case where k=1. Then, with an input candidate character classified by the value of the first digit (the highest place digit) displayed in a white region and an input candidate character classified by a value of other digit displayed in a gray region (indicated by slanting lines in FIG. 5), the group corresponding to the first digit is displayed distinguishably from the groups corresponding to other digits.

When the processing first shifts to Step S3, since k=1, the group displaying unit 12 only needs to display the example shown in FIG. 5. The user having looked at the display only needs to press a selection key corresponding to a group to which the desired character belongs among the groups (the respective groups of the input candidate characters classified by the value of the highest place digit) displayed distinguishably from others. As a result, the processing at Step S4 and the following steps will be executed. When moving to Step S3 for the second time, since k=2, the group displaying unit 12 only needs to display the respective groups of the input candidate characters classified by the value of the second digit so as to be distinguished from the respective groups of the input candidate characters classified by values of other digits. The user having looked at the display only needs to press a selection key corresponding to a group to which the desired character belongs among the groups (the respective groups of the input candidate characters classified by the value of the second digit) displayed distinguishably from others. Hereinafter, every time the processing moves to Step S3, the group displaying unit 12 only needs to similarly switch and display a group to be displayed distinguishably from others.

When each input candidate character is correlated with an m-digit n-ary number, the user operates the selection key m times for inputting one character. When a group is displayed by the display manner illustrated in FIG. 5, the user is allowed to recognize at which time out of m times the selection key for inputting one character is being operated. In a case, for example, where the display shown in FIG. 5 is made for the first time after shifting to Step S3, the user is allowed to recognize that he/she executes first operation, out of three times, as the operation of the selection key for inputting one character.

Figure 6:
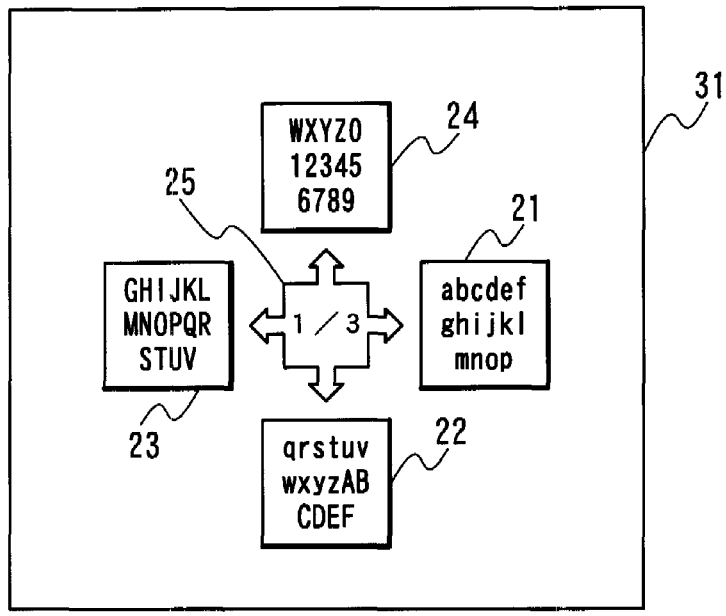
FIG. 6 is a diagram for use in explaining another example of a manner of displaying a group of input candidate characters.

FIG. 6 is a diagram for use in explaining another example of a manner of displaying groups of input candidate characters. The display manner illustrated in FIG. 6 is a displaying manner appropriate when the display region 31 of the display device 14 is a narrow. In the display manner shown in FIG. 6, only groups classified according to a value of a designated digit are displayed. In a case, for example, where k=1 at Step S3, the group displaying unit 12 displays each group of input candidate characters classified by a value of the highest place digit and refrains from displaying the respective groups of input candidate characters classified by values of other digits (see FIG. 6). Even when k has other values, the group displaying unit 12 at Step S3 displays each group of input candidate characters classified by the value of the k-digit (e.g. the respective groups illustrated in FIG. 3(b) and FIG. 3(c)) and refrains from displaying groups of input candidate characters classified by values of other digits.

In addition, also in the display manner shown in FIG. 6, the group displaying unit 12 may cause the display device 14 to display values of k and m. The example illustrated in FIG. 6 shows a case where ⌈k/m (to be specific, ⅓⌉ is displayed on the graphic 25. Thus causing the display device 14 to display the values of k and m allows a user to recognize at which time out of m times the selection key for inputting one character is being operated. Although the example illustrated in FIG. 6 shows a case of displaying values of k and m on the graphic 25, the values of k and m may be displayed in a region different from the graphic 25. In addition, the group displaying unit 12 only needs to update the display of the value of k when the updated k is input from the character structuring unit 13 (e.g. update the display ⌈⅓⌉ to ⌈⅔⌉).

Displaying the values of k and m on the display device 14, however, is not indispensable processing. In other words, the group displaying unit 12 needs not to display ⌈k/m⌉ and the like.

Figure 7:
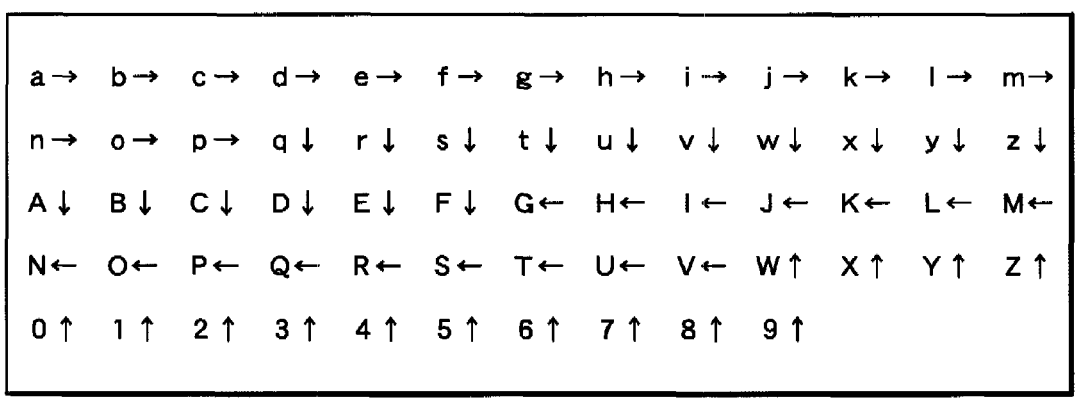
FIG. 7 is a diagram for use in explaining a further example of a manner of displaying a group of input candidate characters.

FIG. 7 is a diagram for use in explaining other example of a manner of displaying a group of input candidate characters, in which the same information as that of FIG. 3(a) is illustrated. In the figure, an input candidate character and an arrow indicting a group to which the character belongs are denoted in pair, so that a user only needs to press a key corresponding to an arrow indicated. According to this arrangement method, since a position of an input candidate character can be always fixed, even at input of the second and the following digits, without changing the position of the candidate character to be input, the user is allowed to press a key according to the denotation of an arrow displayed beside. Since FIG. 7 differs only in a denotation mariner from FIG. 3(a) and is the same in information to be represented to a user, structure and operation of the present invention remains unchanged.

According to the present mode of implementation, by assigning an m-digit value expressed by the n-ary notation to each input candidate character one-for-one, the grouping unit 11 classifies the respective input candidate characters into n groups on a basis of each of m digits. In addition, the group displaying unit 12 displays n groups for each digit. Then, the user is allowed to input a desired character by operating a selection key corresponding to a group to which the desired character belongs. Accordingly, even when the number of kinds of input candidate characters is increased, the number n of the selection keys that the input device 15 has needs not to be increased and even when the number of the selection keys that the input device 15 has is reduced, many kinds of characters can be input. When the number of kinds of input candidate characters is increased, the number m of digits of an n-ary number should be increased.

Moreover, when a third person looks at a selection key operated by the user, because a plurality of input candidate characters belong to the group corresponding to the selection key, the third person is not allowed to specify a character that the user intends to input. The user is accordingly allowed to input a desired character without having a third person know it. In other words, secrecy of an input character can be kept.

Furthermore, when the user operates the input device 15 to input information indicative of the operated the selection key to the character structuring unit 13, the processing at Step S5 and the following steps is executed without making the user wait. The user is accordingly allowed to input characters efficiently (quickly).

In a case where the grouping unit 11 uses random numbers when assigning an m-digit value expressed by the n-ary notation to each input candidate character one-for-one, a group to which each input candidate character belongs with respect to each digit is not fixed. As a result, a third person is not allowed to specify a character that the user intends to input even observing a selection key operated by the user. In other words, secrecy of an input character can be more improved.

Next, a modification example of the first mode of implementation will be described. In the above-described mode of implementation, various character strings whose number of characters is not limited can be input one by one on a character basis. The modification example of the first mode of implementation set forth in the following is applicable to a case of inputting a character string whose number of characters is determined in advance. It is suitable, for example, for input of a password whose number of characters is determined in advance.

Figure 8:
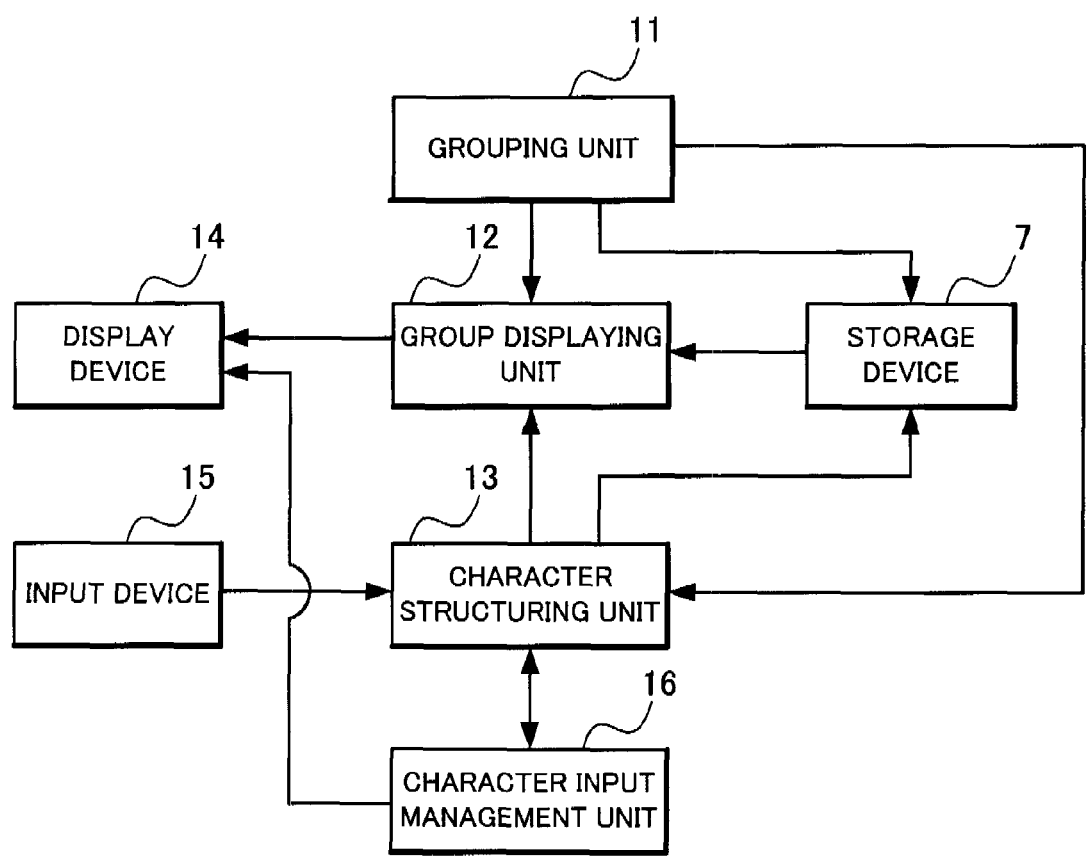
FIG. 8 is a block diagram showing a modification example of the first mode of implementation.

FIG. 8 is a block diagram showing the modification example of the first mode of implementation. Description will be here made, as an example, of a character input system in which an input character string including a predetermined number (assumed to be p) of characters is determined. The same components as those of FIG. 1 are given the same reference numerals as those shown in FIG. 1 to omit description of the same. In the present modification example, the character input system also comprises a character input management unit 16.

The character input management unit 16 updates information indicating to which numbered character in a character string including p characters a value of a digit of an n-ary number being input corresponds. In the following, this information will be referred to as character order information.

In addition, every time an individual character included in a character string is determined, the character input management unit 16 may cause the display device 14 to display the information to that effect. Manner of displaying the information is not specifically limited. The character input management unit 16 may, for example, cause the display device 14 to display a blank with one blank added every time an individual character included in the character string is determined. Alternatively, the character input management unit 16 may present a user that a certain character is determined by switching a background color of an input character candidate between when an odd-numbered character is determined and when an even-numbered character is determined. Alternatively, the character input management unit 16 may directly display up to which numbered characters the determination is made of. The display device 14 may be caused, for example, to display ⌈determination is made of up to the first character⌋ or the like.

The grouping unit 11, the group displaying unit 12, the character structuring unit 13 and the character input management unit 16 are, for example, realized by a CPU operable according to a program (character input program). The CPU is provided, for example, in a portable apparatus such as a cellular phone, a terminal device with a display, a Web television receiver or the like. The program is stored in the storage device in advance.

Next, operation will be described.

Figure 9:
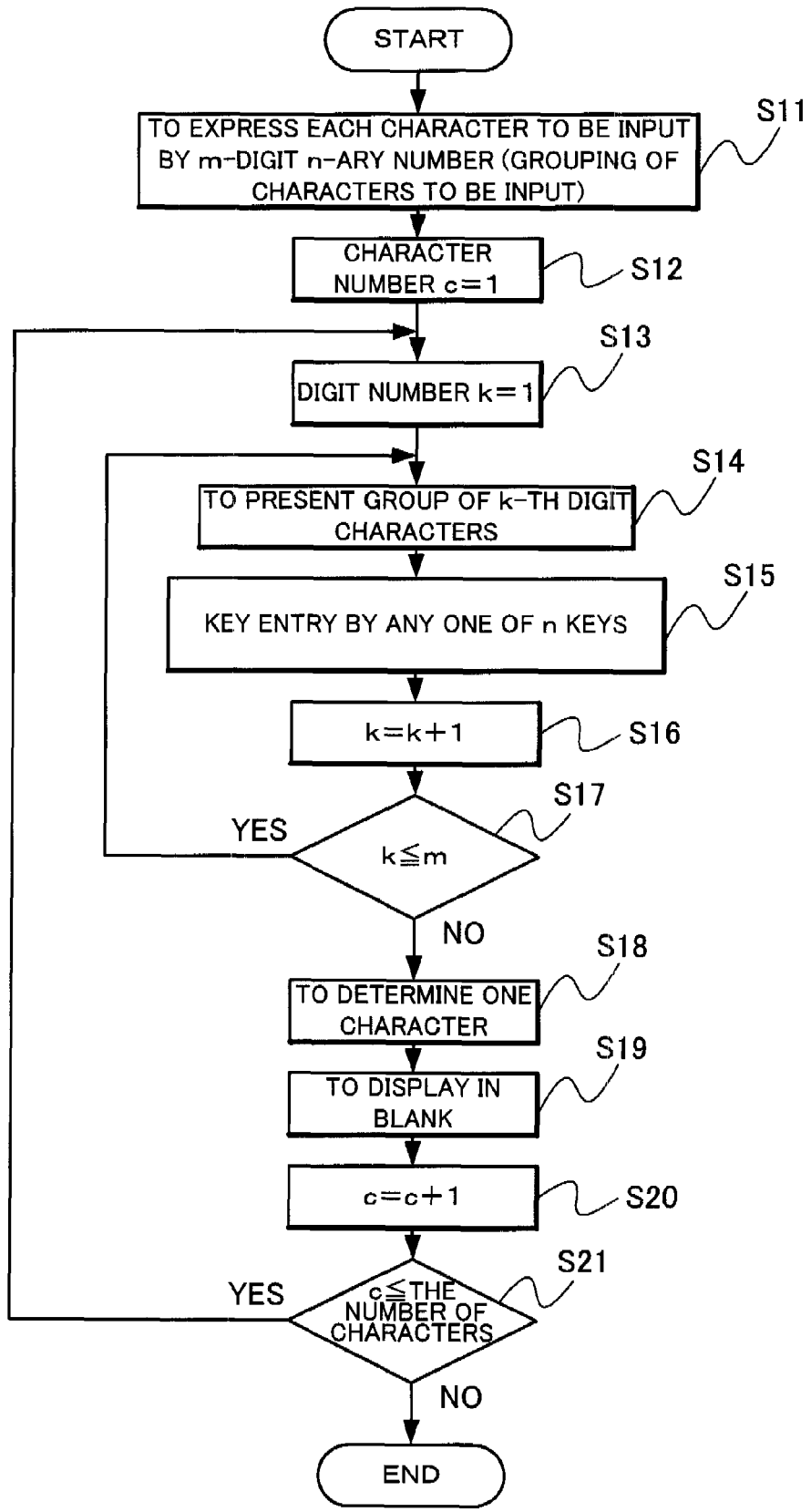
FIG. 9 is a flow chart showing an example of a processing process in the modification example of the first mode of implementation.

FIG. 9 is a flow chart showing an example of a processing process in the modification example of the first mode of implementation. Input candidate characters are determined in advance and a number X of input candidate characters is determined. Also determined in advance is a number n of the selection keys that the input device 15 has. Then, an m-digit value whose m satisfies $X \leq n^m$ is determined in advance as well. Assume here that among m satisfying $X \leq n^m$, the minimum integer is adopted as the number m of digits.

First, the grouping unit 11 assigns an m-digit value expressed by the n-ary notation to each input candidate character one-for-one to classify the respective input candidate characters into n groups on a basis of each of the m digits (Step S11). At Step S11, the grouping unit 11 causes the storage device 7 to store information indicative of a correspondence relationship between each input candidate character and an m-digit n-ary number assigned to each input candidate character. The processing at Step S11 is the same as the above-described processing of Step S1.

Subsequently to Step S11, the character input management unit 16 sets a value of a variable c as character order information (information indicating to which numbered character in a character string a value of a digit of an n-ary number being input corresponds) (Step S12). The value of c being 1 represents that a value of a digit of an n-ary number corresponding to the first character of the character string is being input. The value of c being 2, for example, represents that a value of a digit of an n-ary number corresponding to the second character of the character string is being input. This is also the case with c having other values.

After Step S12, the character structuring unit 13 sets the value of the variable k as information designating a digit to be 1 (Step S13). The character structuring unit 13 outputs the variable k set to 1 to the group displaying unit 12. The processing of Step S13 is the same as the above-described processing of Step S2.

When the variable k is input, the group displaying unit 12 causes the display device 14 to display each group of input candidate characters classified by the value of the k-th digit (Step S14). At Step S14, the group displaying unit 12 refers to the information indicative of a correspondence relationship between each input candidate character and an m-digit n-ary number which is stored in the storage device 7. Then, the group displaying unit 12 extracts an input candidate character whose k-th digit value is in common from the information stored in the storage device 7 on a basis of a k-th digit value. Then, the unit only needs to cause the display device 14 to display a group of input candidate characters classified by the k-th digit value.

After Step S14, the user presses a selection key corresponding to a group to which a desired character belongs among n selection keys. The input device 15 has any one of the n selection keys operated by the user to output information indicating which selection key is operated (information indicative of an operated selection key) to the character structuring unit 13. The character structuring unit 13 causes the storage device 7 to store a value corresponding to the selection key indicated by the information input from the input device 15 (Step S15).

After Step S15, the character structuring unit 13 increments the value of the variable k by one (Step S16). Subsequently, the character structuring unit 13 determines whether the value of the variable k is not more than m (Step S17). When the value of the variable k is not more than m (y at Step S17), repeat the processing of Step S14 and the following steps. When the value of the variable k is not more than m (y at Step S17), the character structuring unit 13 outputs the variable k to the group displaying unit 12 to repeat the processing of Step S14 and the following steps. When the value of the variable k is more than m (n at Step S17), move onto Step S18.

The loop processing at Step S14 through Step S17 is the same as the above-described loop processing at Steps S3 through S6.

When moving to Step S18, the character structuring unit 13 specifies a character corresponding to an m-digit n-ary number determined by a value of each digit stored in the storage device 7 every time the processing moves to Step S15 (Step S18). Processing at Step S18 is the same as the above-described processing at Step S7. Only the difference resides in that at Step S18 of the present modification example, the character structuring unit 13 causes the storage device 7 to store a specified character. When executing the processing of Step S18 again, the character structuring unit 13 causes the storage device 7 to store a specified character as a character subsequent to an already stored character. Thus sequentially storing a specified character, a character string input by the user will be sequentially stored one character by one character. When specifying one character at Step S18, the character structuring unit 13 outputs information that one of the characters included in the character string is determined to the character input management unit 16.

Upon input of the information, the character input management unit 16 causes the display device 14 to display information indicating that one of the characters included in the character string is determined (Step S19). Shown at Step S19 in FIG. 9 is a case where the character input management unit 16 causes the display device 14 to display a blank with one blank added.

Subsequently, the character input management unit 16 increments the value of the variable c by one (Step S20). More specifically, the character input management unit 16 updates the value of the variable c such that the variable c as the character order information indicates that a value of a digit of an n-ary number corresponding to a subsequent character is being input.

After Step S20, the character input management unit 16 determines whether the value of the variable c is not more than p (the number determined in advance as the number of characters included in the character string) (Step S21). When the value of the variable c is not more than p (y at Step S21), the character input management unit 16 notifies the character structuring unit 13 that input of a value of a digit of an n-ary number corresponding to a subsequent character should be started. Then, moving to Step S13, the character input system repeats the processing of Step S13 and the following steps.

When the value of the variable c is larger than p (n at Step S21), end the processing. At this time, the character string (character string including p characters) stored in the storage device 7 will be the character string input. The device to which the character input system is applied (e.g. a portable apparatus such as a cellular phone, a terminal device with a display, a Web television receiver or the like) processes the character string including the p characters as the character string input. The portable apparatus or the terminal device with a display, for example, may execute user authentication by this character string. The Web television receiver may transmit the character string to a server which provides services (kind of service is not limited) through the Internet and the server having received the character string may execute user authentication.

With reference to FIG. 9, a specific example of input of a character string will be described. Assume here that p=5 and a user inputs a character string "Senda". Also assume that at Step S11, the grouping unit 11 assigns 0, 1, 2, . . . (for the sake of convenience, they are denoted by the decimal notation here) to the respective input candidate characters "a"~"z", "A"~"Z" and "0"~"9" and converts the values into three-digit quaternary numbers, thereby assigning a three-digit quaternary number to each input candidate character. Then, assume that the unit causes the storage device 7 to store the correspondence relationship shown in FIG. 2.

After setting c to be 1 at Step S12 and executing processing at Step S13, the character input system starts the loop processing of Step S14 and the following steps. Every time the processing moves to Step S14 after setting k to be 1 at Step S13, the group displaying unit 12 sequentially displays the groups 21 to 24 shown in FIG. 3 in the order shown in FIG.

3(a), FIG. 3(b) and FIG. 3(c). Before setting k to be 4, the processing shifts to Step S14 three times, of which at Step S14 for the first time, for inputting "S" of the character string "Senda", the user presses the left key. At the second-time Step S14, the up key is pressed. At the third-time Step S14, the right key is pressed. When determination is made that k is larger than m at Step S17, the character structuring unit 13 specifies the character "S" (Step S18). Then, the unit causes the storage device 7 to store the character "S". After the subsequent Step S19, the character input management unit 16 sets c to be 2 at Step S20 to again move to Step S13.

Also in a case of c=2, similarly to the above-described case of c=1, the processing moves to Step S14 three times before k is set to be 4. In this case, upon shift to Step S14 for inputting the second character "e", the right key, the down key and the right keys are pressed in this order. When determination is made at Step S17 that k is larger than m, the character structuring unit 13 specifies the character "e" (Step S18). Then, the unit causes the storage device 7 to additionally store the character "e" as a character subsequent to "S". After Step S19, the character input management unit 16 sets c to be 3 at Step S20 to again move to Step S13.

This is also the case with subsequent cases of c=3, c=4 and c=5. In a case of c=3, upon shift to Step S14, the right key, the up key and the down key are pressed in this order. As a result, the character structuring unit 13 specifies the character "n" (Step S18). Then, the character structuring unit 13 causes the storage device 7 to additionally store the character "n" as a character subsequent to "Se".

In a case of c=4, upon shift to Step S14, the right key, the right key and the up key are pressed in this order. As a result, the character structuring unit 13 specifies the character "d" (Step S18). Then, the character structuring unit 13 causes the storage device 7 to additionally store the character "d" as a character subsequent to "Sen".

In a case of c=5, upon shift to Step S14, the right key, the right key and the right key are pressed in this order. As a result, the character structuring unit 13 specifies the character "a" (Step S18). Then, the character structuring unit 13 causes the storage device 7 to additionally store the character "a" as a character subsequent to "Send". As a result, the character string "Senda" is stored in the storage device 7.

Thereafter, c is set to be 6 at Step S20 and determination is made that c is larger than p at Step S21 to end the processing.

Shown in Step S19 of FIG. 9 is a case where the character input management unit 16 causes the display device 14 to display a blank with one blank added. At Step S19, it may be indicated not by a blank that one character is determined but by other manner. The character input management unit 16 may, for example, directly display up to which characters the determination is made of. Up to which characters the determination is made of may be displayed by using a value of the variable c.

It may be presented to a user that a certain character is determined by switching a background color of an input character candidate between when an odd-numbered character is determined and when an even-numbered character is determined. FIG. 11 is a diagram for use in explaining an example of background color switching. In a case, for example, where an odd-numbered character is determined to then move to Step S14, an input candidate character belonging to each group may be displayed with white as a background color as shown in FIG. 11(a) and in a case where an even-numbered character is determined to then move to Step S14, an input candidate character belonging to each group may be displayed with black as a background color as shown in FIG. 11(b). Thus switching a background color enables presentation to a user that a certain one character is determined. For switching a background color as described above, it is only necessary, for example, for the character input management unit 16 to instruct the group displaying unit 12 to switch a background color and when the group displaying unit 12 displays each group at Step S14, cause the display device 14 to display a background color according to the switching instruction.

In the above-described modification example, it is assumed to compare the value of the variable c with p at Step S21 and when the value of the variable c is not more than p, repeat the loop processing. The character input system may determine whether to repeat the loop processing starting at Step S13 not by comparison of the variable c with the predetermined value p but by operation of the input device 15 by a user. In this case, for example, if a key which the input device has and which instructs on character input end is operated before the processing at Step S19 is completed, determination should be made not to shift to the loop processing starting at Step S13. When a control character indicative of character input end is included in an input candidate character and the control character is specified at Step S18, determination may be made not to shift to the loop processing starting at Step S13.

Figure 10:
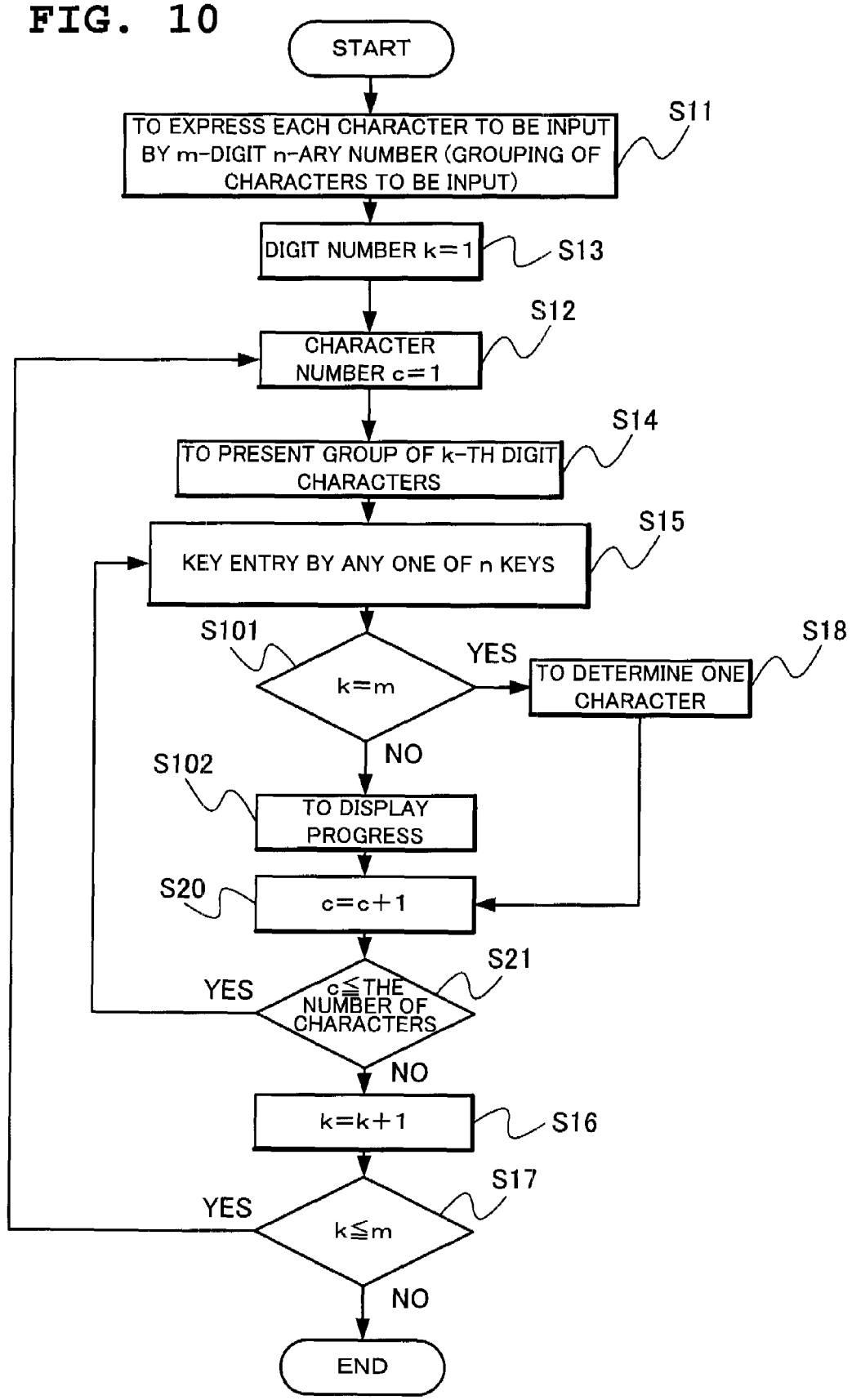
FIG. 10 is a flow chart showing another example of a processing process in the modification example of the first mode of implementation.

The present modification example also allows input on a digit basis instead of input on a character basis. FIG. 10 is a flow chart showing input operation on a digit basis. While in FIG. 9, input of m digits is executed on a character basis to continue the operation until input of the p characters is ultimately completed, in FIG. 10, input of p characters is executed on a digit basis to continue the operation until input of k digits is ultimately completed. Although a total number of inputs is k×p in both cases, in the case of digit-basis input, it is expected that a subsequent character is assumable when a user memorizes a character string by a sequence of characters similarly to a method of inputting the same character string a plurality of times.

Similarly to the already described first mode of implementation, the modification example of the first mode of implementation attains the same effect.

In the above-described first mode of implementation and its modification example, the description has been made of a case, as an example, where among m satisfying $X \leq n^m$, a minimum integer is assumed to be the number of digits. Among m satisfying $X \leq n^m$, a value obtained by adding a redundant number of digits (e.g. 1) to a minimum integer may be adopted as the number of digits of an n-ary number. FIG. 12 is a diagram for use in explaining an example of an n-ary number including a redundant digit. The example shown in FIG. 12 uses a redundant digit as a digit for storing a value of a check sum (CS).

Operation of the grouping unit 11 in this case will be described. The grouping unit 11 determines an m-digit n-ary number including a redundant digit (assumed to be one digit here) at Step S1 (see FIG. 4) or Step S11 (see FIG. 9). At this time, values from the second digit (digit next to the highest place digit) to the m-th digit (the lowest place digit) can be determined by the same processing as that already described. For example, a value obtained by incrementing by one with 0 as the first value may be assigned to each input candidate character and converted into an (m−1)-digit n-ary number, thereby determining values of (m−1) digits from the second digit to the m-th digit. Alternatively, the grouping unit 11 may generate, for an individual input candidate character, a random number which assumes any value of integers from 0 to $n^{m-1}-1$ and convert the random number into an (m−1)-digit n-ary number, thereby determining values of (m−1) digits from the second digit to the m-th digit. In this case, however, the grouping unit 11 refrains from generating the same random number for a different input candidate character.

Then, the grouping unit 11 only needs to determine a highest place digit of each m-digit n-ary number by the following manner. More specifically, the grouping unit 11 should determine a remainder obtained by dividing a sum of the values of the respective digits from the second digit (digit next to the highest place digit) to the m-th digit (lowest place digit) as the highest-place digit of each m-digit n-ary number. Assume, for example, that the grouping unit 11 determines the respective values of the second to the m-th digits of an n-ary number corresponding to the input candidate character "A" are "1", "2" and "2". In this case, the grouping unit 11 determines "1" which is a remainder obtained by dividing a sum of the respective values from the second-digit to the m-th digit (i.e. 1+2+2=5) by n (4 in the example shown in FIG. 12) as the first digit (the highest place digit) of the n-ary number corresponding to the input candidate character "A" (see FIG. 12). While the description has been here made of the input candidate character "A" shown in FIG. 12 as an example, determination should be made by the same manner also when determining the first digit (the highest place digit) of an n-ary number corresponding to other input candidate character.

By thus correlating an m-digit n-ary number including a redundant digit with each input candidate character one-for-one by the grouping unit 11, when a user executes erroneous operation of a selection key, the error can be detected. The error detection processing should be executed before the processing of specifying a character (the processing at Step S7 shown in FIG. 4 or the processing at Step S18 shown in FIG. 9).

Error detection processing will be described here with respect to a case where the character input system shown in FIG. 1 executes the processing shown in FIG. 4 as an example. Before shifting to Step S7, the processing of Step S4 is executed m times to store a value equivalent to each digit of an m-digit n-ary number in the storage device 7. Before executing the processing at Step S7, the character structuring unit 13 calculates a sum of values corresponding to the respective digits excluding the first digit (the highest place digit) among the values corresponding to the respective digits of an m-digit n-ary number and calculates a remainder obtained by dividing the sum by n. When the value corresponding to the first digit of the m-digit n-ary number and the remainder are equal, the character structuring unit 13 determines that user's operation of the selection key has no error to shift to Step S7. When the value corresponding to the first digit of the m-digit n-ary number and the calculated remainder are different values, the character structuring unit 13 determines that the user's operation of the selection key has an error and may cause the display device 14 to display the information to that effect.

Assume, for example, that a four-digit quaternary number is assigned to each input candidate character as shown in FIG. 12. Assume that when inputting the character "A", the user erroneously operates the down key, the down key, the left key and the up key in this order although he/she should have operated the down key, the down key, the left key and the left key in this order. In this case, before shifting to Step S7, the processing of Step S4 has been executed four times to store values "1", "1", "2" and "3" corresponding to the respective digits of the four-digit quaternary number. The character structuring unit 13, prior to execution of the processing of Step S7, calculates a sum of values corresponding to the respective digits other than the first digit (the highest place digit) to calculate a remainder obtained by dividing the sum by n. In this example, 6 as a sum of "1", "2" and "3" is calculated to calculate the remainder 2 obtained by dividing 6 by 4. Since the reminder is different from the value "1" corresponding to the first digit of the four-digit quaternary number, determination is made that the user's operation of the selection key has an error.

Thus by assigning an m-digit n-ary number including a redundant digit to each input candidate character, determination can be made whether there exists an error in user's selection key operation.

Although the description has been made of a case where the character input system shown in FIG. 1 executes the processing shown in FIG. 4 as an example, the same error detection processing can be executed when the character input system shown in FIG. 8 executes the processing shown in FIG. 9.

In the above-described first mode of implementation and modification example of the first mode of implementation, a user's operation error can be detected when the grouping unit 11 uses random numbers at the time of assigning an m-digit value expressed by the n-ary notation to each input candidate character one-for-one. In the following, description will be made of a case, as an example, where the number of input candidate characters is 65 (i.e. X=65) and the number of selection keys that the input device 15 has is four (i.e. n=4). Assume here that as the number of digits of an n-ary number, a minimum value of m satisfying $X \leq n^m$ is adopted. Then, the number of digits will be m=4.

First, for the comparison with a case where a random number is used, description will be made of a case where integers 0, 1, 2, . . . are sequentially assigned to the respective input candidate characters and the integers are converted into m-digit n-ary numbers. In this case, noting the highest place digit of the n-ary number assigned to each input candidate character, the value of the highest place digit will be "0" in the first input candidate character to the 64-th input candidate character. Then, only in the 65th input candidate character, the value of the highest place digit will be "1". In other words, the values of the highest place digits vary.

When using a random number, for an individual input candidate character, the grouping unit generates a random number which assumes any value of the integers from 0 to $n^m-1$ (i.e. an integer which can be expressed by an m-digit n-ary number) and converts the random number into an m-digit n-ary number. Kinds of integers from 0 to $n^m-1$ are larger than kinds of input candidate characters in number. In the present example, in particular, since the number of kinds of input candidate characters is 65, kinds of values which can be used as random numbers are much larger than kinds of input candidate characters in number. This represents that the number of random numbers which can not be assigned to the input candidate characters is large. In addition, there is no such variation in a value of the highest place digit as described above, and noting each digit, values from 0 to n−1 (from 0 to 3 in this example) scatter approximately evenly in the input candidate characters as a whole. Accordingly, the grouping unit 11 is allowed to assign an m-digit n-ary number to each input candidate character such that values of the respective digits scatter approximately evenly in the input candidate characters as a whole and cause the storage device 7 to store information indicative of a correspondence relationship between each input candidate character and an m-digit n-array number.

Assume that at this time, when inputting a desired character, the user executes erroneous operation of a selection key. Then, since random numbers which can not be assigned to the input candidate characters are large in number, there are many cases where when specifying a character at Step S7 (see FIG. 4) or Step S18 (see FIG. 9), the character structuring unit 13 fails to specify a character corresponding to an m-digit n-ary number determined according to user's operation. When failing to specify a character corresponding to an m-digit n-ary number determined according to user's operation at Step S7 (see FIG. 4) or Step S18 (see FIG. 9), the character structuring unit 13 only needs to determine that the user's operation of a selection key has an error to cause the display device 14 to display information to that effect.

When using a random number, the grouping unit 11 refrains from generating the same random number for a different input candidate character.

Thus, use of a random number enables an error in selection key operation to be detected without increasing the number of redundant digits as in the example shown in FIG. 12. In addition, even without a random number, assigning an m-digit n-ary number to each input candidate character so as not to cause variation in a value of each digit obtains the same effect.

While in the foregoing, the description has been made of a case, for example, where the right key, the down key, the left key and the up key that the input device 15 has correspond to "0", "1", "2" and "3", respectively, this correspondence relationship is by way of example only. Correspondence relationship between a selection key and a value indicative of one digit of an n-ary number is not specifically limited. In addition, the group displaying unit 12 may change a display position of a group corresponding to each value every time one character is specified such that a correspondence relationship between a selection key and a value changes for each character.

The above description has been made of a case, as an example, where the group displaying unit 12 displays groups of input candidate characters classified by a value of a digit starting at a higher place digit and the character structuring unit 13 causes the storage device 7 to store a value of a digit according to operation of the selection key. The order of digits subjected to this processing needs not to start at a higher place digit. It is possible, for example, to execute processing starting at a lower place digit with the lowest place digit as the first digit, and then sequentially the second digit, the third digit, the fourth digit, . . . . In addition, for example, with respect to each digit, the group displaying unit 12 may display a group of input candidate characters classified by a value of a digit in an arbitrary order and the character structuring unit 13 may cause the storage device 7 to store a value of the digit according to operation of the selection key.

Next, description will be made of a manner of changing information indicative of a correspondence relationship between each input candidate character and an m-digit n-ary number generated by the grouping unit 11. When producing a plurality of character input systems, the grouping unit 11 of each character input system may be designed to generate the same information all the time as information indicative of a correspondence relationship between each input candidate character and an m-digit n-ary number. In other words, in any character input system, a correspondence relationship between each input candidate character and an m-digit n-ary number may be fixed all the time. This manner will be referred to as the first manner. The first manner enables costdown of character input system production.

On the other hand, when producing a plurality of character input systems, the grouping unit 11 of each character input system may be designed to prevent information indicative of a correspondence relationship between each input candidate character and an m-digit n-ary number from changing although the correspondence relationship between each input candidate character and an m-digit n-ary number varies with each character input system. This manner will be referred to as the second manner. Since with the second manner, a correspondence relationship between each input candidate character and an m-digit n-ary number varies with each character input system, secrecy of an input character can be more enhanced than that by the first manner. In addition, since the grouping unit 11 of each character input system refrains from changing information indicative of a correspondence relationship between each input candidate character and an m-digit n-ary number, a user using a certain character input system is allowed to memorize in which order the selection keys should be operated for input of which character.

Furthermore, when producing a plurality of character input systems, each character input system may be designed to have a different correspondence relationship between each input candidate character and an m-digit n-ary number and to change information indicative of a correspondence relationship between each input candidate character and an m-digit n-ary number with each user. This manner will be referred to as a third manner. In the third manner, a user first operates a key of the input device 15 to notify the grouping unit 11 of user's own identification information. At this time, there is no need of notification by a character or a character string. The grouping unit 11 only needs to determine, for example, that [Father] will input a character when a certain key is operated and determine, for example, that [first son] will input a character when other key is operated. [Father] and [first son] shown here are examples of users. With the third manner, the grouping unit 11 changes information indicative of a correspondence relationship between each input candidate character and an m-digit n-ary number with each user. It is accordingly possible to more enhance secrecy of an input character than that by the second manner. In the third manner, the grouping unit 11 fixes a correspondence relationship between each input candidate character and an m-digit n-ary number for each individual user. Each user is accordingly allowed to memorize in which order the selection keys should be operated for input of which character.

Moreover, the grouping unit 11 may change information indicative of a correspondence relationship between each input candidate character and an m-digit n-ary number every time one character is determined. This manner will be referred to as the fourth manner. With the fourth manner, because information indicative of a correspondence relationship between each input candidate character and an m-digit n-ary number is changed every time one character is determined, secrecy of an input character can be more enhanced than that by the third manner. The character input system shown in FIG. 1, when determining a subsequent character after determining one character, again executes the processing of Step S1 (see FIG. 4) and the following steps (see FIG. 4). At this time, every time the processing of Step S1 is executed, the grouping unit 11 only needs to generate a random number which assumes any of the values of integers from 0 to $n^m-1$ (i.e. integers which can be expressed by an m-digit n-ary number) for each input candidate character and convert the random number into an m-digit n-ary number to determine a correspondence relationship between each input candidate character and an m-digit n-ary number. As a result, every time one character is determined, the information indicative of a correspondence relationship between each input candidate character and an m-digit n-ary number can be changed. When changing the information indicative of a correspondence relationship between each input candidate character and an m-digit n-ary number, the character input system shown in FIG. 8 only needs to execute the processing of Step S11 shown in FIG. 9 immediately before Step S14 shown in FIG. 9. Then, when executing the processing of Step S11 immediately before Step S14, for each input candidate character, the grouping unit 11 only needs to generate a random number which assumes any of the values of integers from 0 to $n^m-1$ and convert the random number into an m-digit n-ary number to determine a correspondence relationship between each input candidate character and an m-digit n-ary number. As is already described, the grouping unit 11 refrains from generating the same random number for a different input candidate character.

In the first mode of implementation and its modification example, the selection unit is realized by the selection key. The input unit is realized by the input device 15. The display unit is realized by the group displaying unit 12 and the display device 14. The character specifying unit is realized by the character structuring unit 13.

Second Mode of Implementation

Figure 13:
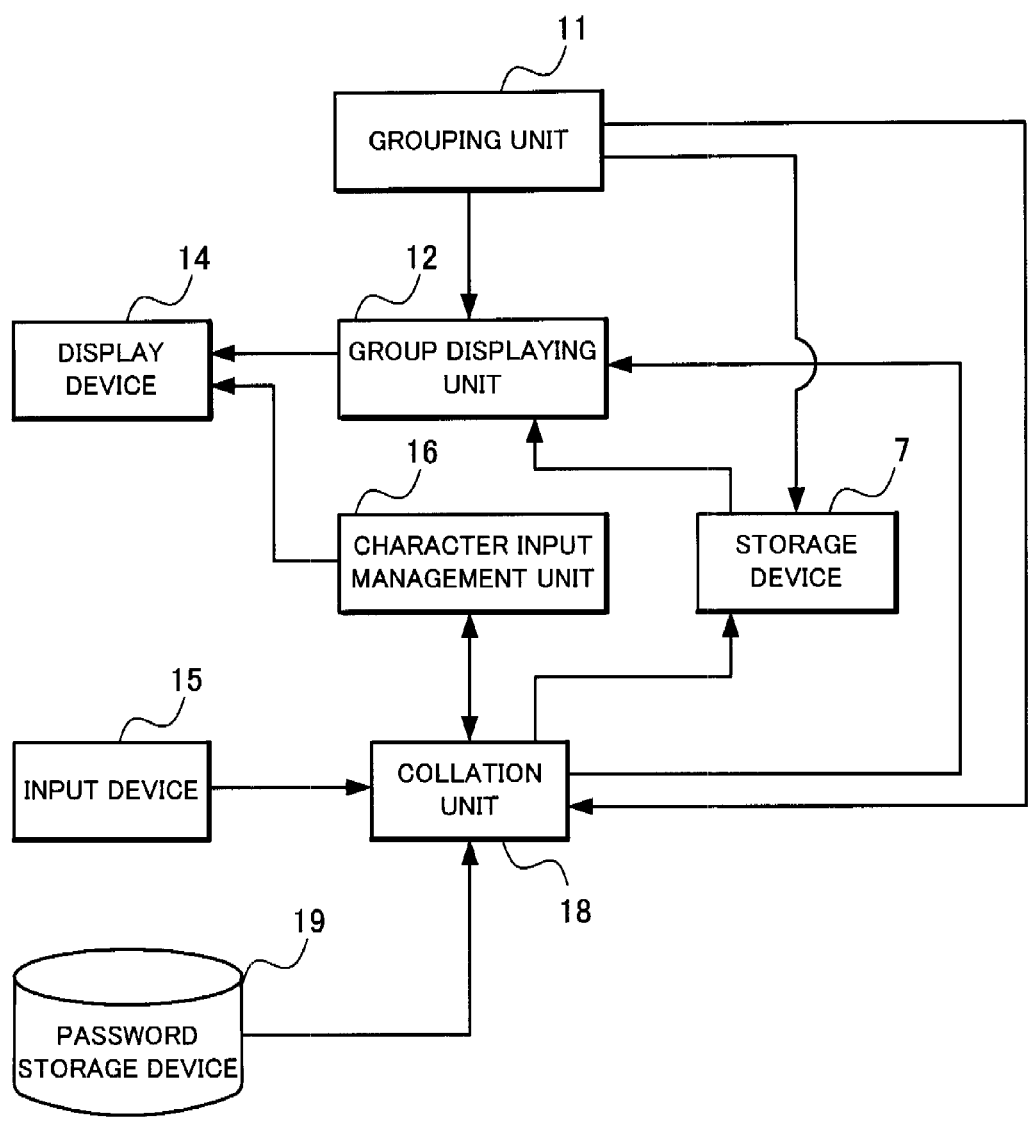
FIG. 13 is a block diagram showing a second mode of implementation of a character input system according to the present invention.

A character input system according to a second mode of implementation of the present invention executes user authentication in response to user's key operation. The character input system according to the present mode of implementation can be accordingly referred to as an authentication system. FIG. 13 is a block diagram showing the second mode of implementation of the character input system according to the present invention. The same component as those of the first mode of implementation and of the modification example of the first mode of implementation are given the same reference numerals as those of FIG. 1 and FIG. 8 to omit their description. As shown in FIG. 13, the character input system according to the second mode of implementation comprises a grouping unit 11, a group displaying unit 12, a character input management unit 16, a collation unit 18, a display device 14, an input device 15 and a password storage device 19.

The password storage unit 19 stores a password for use in authentication. The password is a character string formed of input candidate characters. The number of characters of input candidate characters included in a password is assumed to be p. Before the character input system according to the present mode of implementation executes authentication, a password is stored in the password storage unit 19 in advance.

The input device 15 according to the present mode of implementation has a selection key and outputs information indicating which selection key is operated similarly to the input device 15 according to the first mode of implementation. In the present mode of implementation, however, the input device 15 outputs the information indicating which selection key is operated to the collation unit 18.

The collation unit 18 receives input of the information indicating which selection key is operated q times per one character from the input device 15. Then, the collation unit 18 causes a storage device 7 to store q values of digits (q digits) of an m-digit n-ary number corresponding to one character according to the input information. Here, q is an integer satisfying $1 \leq q \leq m$. Also assume here that values of q digits of an m-digit n-ary number corresponding to one character are values of higher place q digits of the n-ary number. The collation unit 18 repeats the operation as many times as the number of characters included in the password. In other words, repeat p times.

For each input candidate character included in a password stored in the password storage device 19, the collation unit 18 collates values of q digits of an n-ary number corresponding to the input candidate character included in the password and values of q digits corresponding to input information (information indicating which selection key is operated). Since $1 \leq q \leq m$, collation will be made of a part or all of digit values of an m-digit n-ary number. All the digit values will be collated when q=m. Then, with respect to each of the input candidate characters included in the password, when they coincide in the values of q digits, determination will be made that authentication succeeds. When any of input candidate characters included in the password fails in coinciding in any of q digit values, determination will be made that authentication fails.

The grouping unit 11, the group displaying unit 12, the character input management unit 16 and the collation unit 18 are realized, for example, by a CPU operable according to a program (character input program (which can be also referred to as an authentication program)). The CPU is provided, for example, in a portable apparatus such as a cellular phone, a terminal device with a display, a Web television receiver or the like. The program is stored in the storage device in advance.

Next, operation will be described.

Figure 14:
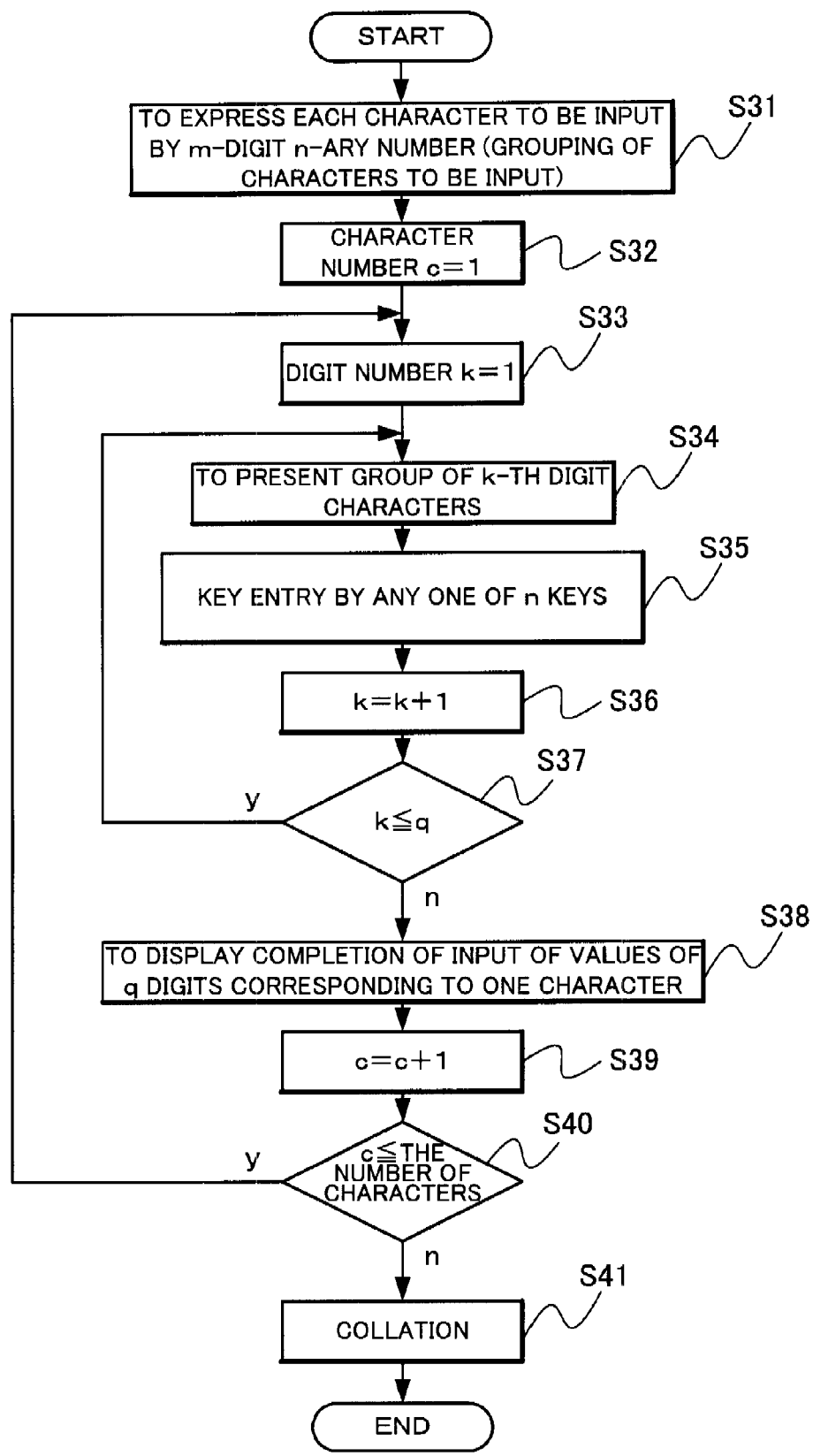
FIG. 14 is a flow chart showing an example of a processing process of the character input system according to the second mode of implementation.

FIG. 14 is a flow chart showing an example of a processing process of the character input system according to the second mode of implementation. Input candidate characters are determined in advance and a number X of input candidate characters is determined. Also determined in advance is a number n of the selection keys that the input device 15 has. Then, an m-digit value whose m satisfies $X \leq n^m$ is determined in advance as well. Assume here that among m satisfying $X \leq n^m$, a minimum integer is adopted as the number m of digits. The password storage device 19 is assumed to store a character string formed of input candidate characters in advance.

First, the grouping unit 11 assigns an m-digit value expressed by the n-ary notation to each input candidate character one-for-one to classify the respective input candidate characters into n groups on a basis of each of the m digits (Step S31). At Step S31, the grouping unit 11 causes the storage device 7 to store information indicative of a correspondence relationship between each input candidate character and an m-digit n-ary number assigned to the input candidate character.

Subsequently to Step S31, the character input management unit 16 sets a value of a variable c as character order information to be 1 (Step S32). The character order information is information indicating to which numbered character in a character string (to be specific, a password) a value of a digit of an n-ary number being input corresponds.

The processing of Steps S31 and S32 is the same as the above-described processing of Steps S11 and S12.

After Step S32, the collation unit 18 sets the value of the variable k as information designating a digit to be 1 (Step S33). The collation unit 18 outputs the variable k set to 1 to the group displaying unit 12. The processing of Step S33 is the same as the above-described processing by the character structuring unit 13 at Step S13.

When the variable k is input, the group displaying unit 12 causes the display device 14 to display each group of input candidate characters classified by the value of the k-th digit (Step S34). At Step S34, the group displaying unit 12 refers to information indicative of a correspondence relationship between each input candidate character and an m-digit n-ary number which is stored in the storage device 7. Then, the group displaying unit 12 extracts an input candidate character whose k-th digit value is in common from the information stored in the storage device 7 on a basis of a k-th digit value.

Then, the unit only needs to cause the display device 14 to display a group of input candidate characters classified by the k-th digit value.

After Step S34, the user presses a selection key corresponding to a group to which a desired character belongs among the n selection keys. The input device 15 has any of the n selection keys operated by the user to output information indicating which selection key is operated (information indicative of an operated selection key) to the collation unit 18. The collation unit 18 causes the storage device 7 to store a value corresponding to the selection key indicated by the information input from the input device 15 (in other words, a value of one digit of an m-digit n-ary number corresponding to one character) (Step S35).

After Step S35, the collation unit 18 increments the value of the variable k by one (Step S36). The processing at Steps S34 to S36 is the same as the above-described processing of Steps S14 to 516.

Subsequently, the collation unit 18 determines whether the value of the variable k is not more than q (Step S37). As is already described, q is an integer satisfying $1 \leq q \leq m$. When the value of the variable k is not more than q (y at Step S37), move to Step 34 to repeat the processing of Step S34 and the following steps. When the value of the variable k is more than q (n at Step S37), move to Step S38.

The collation unit 18 may determine a value of q to be a fixed value. The unit alternatively changes the value of q. When changing the value of q, the collation unit 18, for example, changes a value of q at every user's authentication. At this time, the collation unit 18 refrains from changing the value of q at least in the loop processing starting at Step S33. The collation unit 18 may also change a value of q at each processing corresponding to one character, for example. In other words, when moving to Step S33, the unit may change a value of q.

Repeat the processing of Steps S34 to S37 q times until the collation unit 18 determines that k is larger than q. The collation unit 18 will accordingly cause the storage device 7 to store values of q digits according to the information (information indicating which selection key is operated) input from the input device 15 until the determination that k is larger than q is made in Step S37. In the present example, values of q digits are values of higher place q digits of an m-digit n-ary number.

At Step S38, the character input management unit 16 causes the display device 14 to display information that input of values of q digits of an m-digit n-ary number corresponding to one character is completed (in other words, information that making the storage device 7 store values of q digits is completed) (Step S38). Manner of displaying the information is not specifically limited. For example, every time storage of values of q digits of an m-digit n-ary number corresponding to one character into the storage device 7 is completed, the character input management unit 16 may cause the display device 14 to display a blank with one blank added. Alternatively, the character input management unit 16, similarly to the case shown in FIG. 11, may present a user that input of values of q digits of an m-digit n-ary number corresponding to one character is completed by switching a background color of an input candidate character between when input of values of q digits related to an odd-numbered character is completed and when input of values of q digits related to an even-numbered character is completed. Alternatively, the character input management unit 16 may directly display up to which character the processing of storing values of the q digits is completed. The unit may, for example, cause the display device 14 to display [completed up to a first character] or the like. As a value indicating up to which character the processing is completed, the value of the variable c may be used.

After Step S38, the character input management unit 16 increments the value of the variable c by one (Step S39). Then, the character input management unit 16 determines whether the value of the variable c is not more than p (the number of input candidate characters included in the password) (Step S40). When the value of the variable c is not more than p (y at Step S40), the character input management unit 16 notifies the collation unit 18 that input of a value of a digit of an n-ary number corresponding to a subsequent character should be started. Then, moving to Step S33, the character input system repeats the processing of Step S33 and the following steps. When the value of the variable c is more than p (n at Step S40), move to Step S41.

Until the character input management unit 16 determines that c is larger than p, repeat the processing of Step S33 to Step S40. The collation unit 18 will accordingly cause the storage device 7 to store values of q digits (which correspond to one character) for p characters before the determination is made that c is larger than p at Step S40.

At Step S41, the collation unit 18 collates the digit values of the p characters stored so far and digit values corresponding to the respective input candidate characters included in the password stored in the password storage device 19 to determine that authentication succeeds when they coincide and determines that authentication fails when there exists at least one of values failing to coincide (Step S41).

At Step S41, the collation unit 18 first specifies, for each input candidate character included in the password stored in the password storage device 19, an m-digit n-ary number corresponding to the input candidate character. Since the information indicative of a correspondence relationship between each input candidate character and an m-digit n-ary number is stored in the storage device 7, the collation unit 18 is allowed to specify an m-digit n-ary number corresponding to the input candidate character. The collation unit 18 extracts q digit values (values of higher place q digits in this case) from an m-digit n-ary number corresponding to each input candidate character included in the password. Then, the collation unit 18 determines whether the q digit values stored in the storage device 7 when c=1 and values of q digits corresponding to the first character of the password coincide with each other or not. Similarly, the unit determines whether values of the q digits stored in the storage device 7 when c=2 and values of q digits corresponding to the second character of the password coincide with each other or not. The collation unit 18 executes the same processing until the processing of the last character (p-th character) of the password is completed. Then, when the values coincide in all the digits, determination is made that user authentication succeeds. When there exists at least one digit whose value differs, determination is made that user authentication fails. When there exists at least one digit whose value is different, the processing can be then finished.

The collation unit 18, when determining that user authentication succeeds, transfers the password stored in the password storage unit 19 to an apparatus (e.g. a portable apparatus, a terminal device with a display, a Web television receiver or the like) to which the present invention is applicable. These apparatuses authenticate a user by using the password. These apparatuses may alternatively transmit the password to a server which provides services (kind of service is not limited) through the communication network and the server having received the password may execute user authentication. More specifically, the character input system according to the present mode of implementation, with a password stored in advance, executes user authentication according to user's selection key operation and when authentication succeeds, transfers the password to an apparatus which provides services in practice, so that the apparatus providing the services in practice newly executes user authentication. Since without the user's direct input of a password to an apparatus which provides services in practice or the like, authentication is executed in the character input system according to the present mode of implementation which stores the password, user authentication can be realized by user's operation of a selection key to an extent that enables q digits ($1 \leq q \leq m$) to be specified for one character. When the collation unit 18 is realized by a CPU of an apparatus which provides services in practice, no password transmission processing is required.

With reference to FIG. 14, a specific example of authentication will be described. Description will be here made with respect to a case where the password storage unit 19 stores a character string "Senda" as a password as an example. Since "Senda" has five characters, p=5 holds in this example. Also assume in the present example that q=1. More specifically, with respect to one character, the collation unit 18 causes the storage device 7 to store a value of one digit (value of the highest place digit) of an m-digit n-ary number corresponding to the character according to input information.

Also assume that the grouping unit 11 assigns 0, 1, 2, . . . (for the sake of convenience, they are here denoted by the decimal notation) to the respective input candidate characters "a"~"z", "A"~"Z" and "0"~"9" and converts the values into three-digit quaternary numbers, thereby assigning a three-digit quaternary number to each input candidate character. Then, assume that the unit causes the storage device 7 to store the correspondence relationship shown in FIG. 2.

After setting c to be 1 at Step S32 and executing processing at Step S33, the character input system starts the processing of Step S34 and the following steps. Since q=1 in this example, the processing of Steps S34 to S37 is executed once for one character. Then, since there occurs no shift to Step S34 because of k=2, the group displaying unit 12 displays the respective groups 21 to 24 as shown in FIG. 3(a) at Step S34. When c=1, that is, when the user executes operation related to the first character, the user presses the left key corresponding to the group 23 (see FIG. 3(a)) to which the first character "S" of the password belongs. Upon pressing of the left key, the collation unit 18 causes the storage device 7 to store the value 2 corresponding to the left key as a first digit value of an n-ary number corresponding to "S". When the determination is made that k is larger than q (1 in this example) at Step S37, the character input management unit 16 sets c to be 2 after the processing of Step S38 to again move to Step S33.

Also in a case of c=2, similarly to the above-described case of c=1, the group displaying unit 12 displays the respective groups 21 to 24 as shown in FIG. 3(a) at Step S34. When c=2, that is, when the user executes operation related to the second character, the user presses the right key corresponding to the group 21 (see FIG. 3(a)) to which the second character "e" of the password belongs. Upon pressing of the right key, the collation unit 18 causes the storage device 7 to store the value 0 corresponding to the right key as a first digit value of an n-ary number corresponding to "e". When the determination is made that k is larger than q at Step S37, the character input management unit 16 sets c to be 3 after the processing of Step S38 to again move to Step S33.

This is also case with subsequent cases of c=3, c=4 and c=5. In a case of c=3, upon shift to Step S34, the right key (corresponding to the group to which "n" belongs) is pressed. As a result, the collation unit 18 causes 0 as a first digit value of an n-ary number corresponding to "n" to be stored. When c=4, upon shift to Step S34, the right key (corresponding to the group to which "d" belongs) is pressed. As a result, the collation unit 18 causes 0 as a first digit value of an n-ary number corresponding to "d" to be stored. In a case of c=5, upon shift to Step S34, the right key (corresponding to the group to which "a" belongs) is pressed. As a result, the collation unit 18 causes 0 as a first digit value of an n-ary number corresponding to "a" to be stored.

Thereafter at Step S39, c is set to be 6 and determination is made that c is larger than p (5 in this example) at Step S40 to shift to Step S41. At this time, as a result of user's operation, "2" is being stored as a first digit value of an n-ary number corresponding to the first character. Similarly, "0", "0", "0" and "0" are being stored as first digit values of n-ary numbers corresponding to the second to fifth characters, respectively.

The collation unit 18 collates the respective values "2", "0", "0", "0" and "0" stored as a result of user's operation and a first digit value of an m-digit n-ary number corresponding to each character of the password stored in the password storage device 19. Since first digit values of m-digit n-ary numbers corresponding to the respective characters "S", "e", "n", "d" and "a" of the password are "2", "0", "0", "0" and "0" and the values are coincident in each character, the collation unit 18 determines that user authentication succeeds. Then, the unit transfers the password stored in the password storage device 19 to a device to which a character input system is applied.

Since shown in this specific example is a case where q=1, the processing of Steps S34 to S37 is executed once for each character. When q is not less than 2, the processing of Steps S34 to S37 is executed a plurality of times for each character and values of a plurality of digits (higher place q digits of an n-ary number) will be stored as values corresponding to one character. Then, at the time of collation, the values of the plurality of digits are collated with each other.

The more the number of digits for use in collation is, the more the precision of user authentication improves accordingly. In this case, the number of times of execution of the processing of Steps S34 to S37 is increased to increase the number of user's operations of a selection key. It is therefore necessary to determine a value of q in consideration of required user authentication precision and burden on user's key operation.

In addition, as is already described, the value of q may be changed. One example of changing the value of q is shown in the following. After the completion of the processing at Step S41, the collation unit 18, for example, starts a timer to count a lapse of time. Then, when the processing of Step S31 (or Step S32) is started again, count the time from the completion of Step S41 to the start of Step S31 (or Step S32). In other words, count the time from the completion of the authentication until the start of next authentication. The collation unit 18 only needs to set a value of q to be larger as the counted time becomes longer and start the processing of Step S33 and the following steps. For example, when the time from the completion of authentication until the start of next authentication is not less than 0 sec. and less than L sec., set q=1, when the same is not less than L sec. and less than M sec., set q=2 and when the same is not less than M sec., set q=3 to start the processing of Step S33 and the following steps.

When a time period before subsequent user authentication starts after authentication once succeeds is short, it is expected that not so high a precision is demanded in the subsequent user authentication. Accordingly, with q=1 determined as described above, user's operation burden can be mitigated. On the other hand, as a time period from once success of user authentication until the start of subsequent user authentication becomes longer, the higher precision will be demanded in the subsequent user authentication. Accordingly, by setting q=2 or q=3 as described above, user authentication precision is enhanced.

Another example of changing a value of q is shown in the following. At the start of the processing at Step S33, the collation unit 18 counts a time lapse from the start of the last processing of Step S33. More specifically, count a time required for causing the storage device 7 to store q digit values corresponding to one character. The collation unit 18 only needs to set a value of q to be larger as the time becomes longer and start the processing of Step S33 and the following steps. For example, when the counted time is not less than 0 sec. and less than a sec., set q=1, when the same is not less than a sec. and less than β sec., set q=2 and when the same is not less than β sec., set q=3 to start the processing at Step S33 and the following steps. Longer time required from the start of the last processing of Step S33 until the start of Step S33 denotes that determination of one character that the user wants to input takes time. Accordingly, when the time is short, decreasing the value of q to mitigate user's operation burden and on the other hand, when user's determination time is long, increasing the value of q to enable precision of user authentication to be increased. At the first shift to Step S33, a predetermined value may be used as q. In a case where a user's key operation error can be detected, if user's key operation is detected to have an error upon shift to Step S33 after the last processing of Step S33, the value of q can be changed to a larger value.

In addition, as a manner of changing the information indicative of a correspondence relationship between each input candidate character and an m-digit n-ary number generated by the grouping unit 11 in the second mode of implementation, the second manner, the third manner or the fourth manner described in the first mode of implementation may be adopted. In such a case, secrecy of an input character can be more enhanced than a case where the first manner is adopted which is described in the first mode of implementation.

In the second mode of implementation, the character input system may be designed to comprise the character structuring unit 13 (see FIG. 1) to cause the password storage device 19 to store an input character string as a password as described in the first mode of implementation.

According to the present mode of implementation, the group displaying unit 12 displays n groups on a digit basis. Then, a user is allowed to input information which can specify a password only by operating a selection key corresponding to a group to which each character of the password belongs. Accordingly, even when the number of kinds of input candidate characters included in a password is increased, there is no need of increasing the number n of selection keys that the input device 15 has and even when the number of selection keys that the input device 15 has is small, it is possible to input information which can specify a password.

In addition, even if a third person looks at a selection key operated by a user, because a plurality of input candidate characters belong to a group corresponding to the selection key, the third person is not allowed to specify a password. Secrecy of the password can be accordingly kept. Furthermore, since no user will be kept waiting similarly to the first mode of implementation, authentication can be executed quickly.

In the present mode of implementation, the password storage unit 19 stores a password in advance and the collation unit 18 collates values of q digits according to input information and values of q digits of an m-digit n-ary number according to each character of the password stored in advance. Accordingly, user's operation of a selection key equivalent to q digits per one character enables user authentication. While the above description has been made assuming that q satisfies 1≦q≦m, q may be determined as a value satisfying 1≦q≦m when determining q. In this case, the user needs not to execute all the operation equivalent to m digits per one character, which enables user authentication to be executed with a burden on user's key operation mitigated.

Similarly to the first mode of implementation, also in the second mode of implementation, a correspondence relationship between a selection key and a value indicative of one digit of an n-ary number is not limited in particular.

The above description has been made with respect to a case, as an example, where the group displaying unit 12 displays groups of input candidate characters classified by values of digits starting at a higher place digit and the collation unit 18 causes the storage device 7 to store a value of a relevant digit according to operation of a selection key. The order of digits to be processed needs not to start at a higher place digit. The processing may, for example, be sequentially started from a lower place digit. For example, the group displaying unit 12 may display groups of input candidate characters classified by values of digits in an arbitrary order and the collation unit 18 may cause the storage device 7 to store a value of a relevant digit according to operation of the selection key.

In each of the above-described modes of implementation, as an example of a selection key, four keys (up key, down, key, right key, left key) are shown which indicate up, down, right and left directions, respectively. The selection key is not limited to a key indicating such a direction. When the input device 15 has number keys from 0 to 9, for example, the number keys may be used as the selection keys. In this case, the grouping unit 11 only needs to assign an m-digit decimal number to each input candidate character at the above-described Step S1 (see FIG. 4), Step S11 (see FIG. 9) or Step S31 (see FIG. 14).

Figure 16:
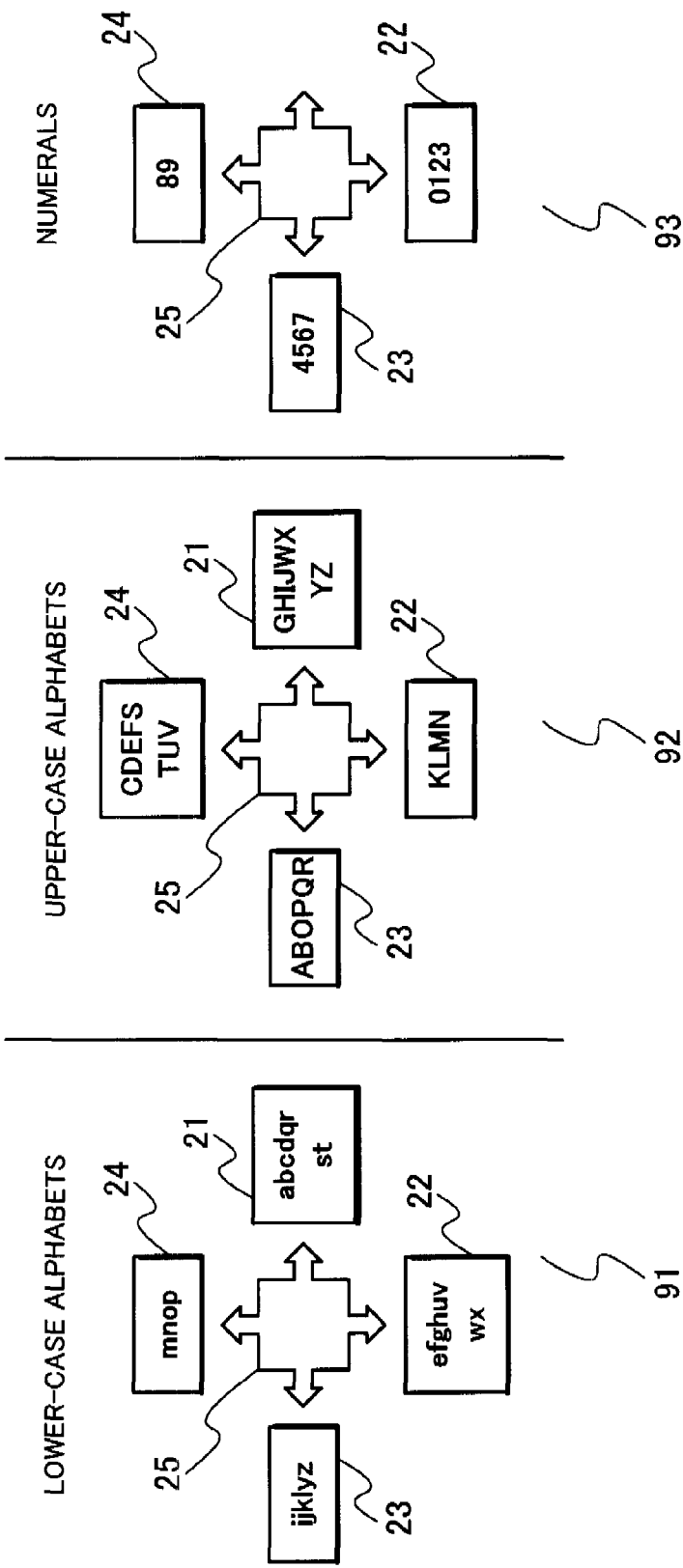
FIG. 16 is a diagram for use in explaining a display example in a case where an input candidate character belonging to each group is displayed in a different region on a basis of a kind of character.

In each of the above-described modes of implementation, when displaying a group of input candidate characters (Step S3, Step S14 and Step S34), the group displaying unit 12 causes the display device 14 to display groups of input candidate characters classified by values of k-th digits (see FIG. 3). At this time, the group displaying unit 12 may display an input candidate character belonging to each group of input candidate characters classified by a value of a k-th digit in a different region for each kind of characters. FIG. 15 and FIG. 16 are diagrams for use in explaining a display example in a case where input candidate characters belonging to each group are displayed in different regions for each kind of characters. Shown in FIG. 15 is an example where the respective input candidate characters belonging to the respective groups shown in FIG. 3(a) are displayed in different regions for each kind of characters. Shown in FIG. 16 is an example where the respective input candidate characters belonging to the respective groups shown in FIG. 3(b) are displayed in different regions for each kind of characters. In this example, shown as kinds of characters are lower-case alphabets, upper-case alphabets and numerals. In FIG. 15 and FIG. 16, the respective groups 21 to 24 are groups of input candidate characters having "0", "1", "2" and "3", respectively, as one of digit values. This point is the same as in the case shown in FIG. 3.

FIG. 15 and FIG. 16 each show a region 91 which displays a lower-case alphabet, a region 92 which displays an upper-case alphabet and a region 93 which displays a numeral. In addition, also shown in the respective regions 91, 92 and 93 is a graphic 25 indicative of a correspondence relationship between each group and the four selection keys (up key, down key, left key and right key).

To the group 21 shown in FIG. 3(a), only the lower-case letters belong. When displaying the group 21 shown in FIG. 3(a) in a manner shown in FIG. 15, therefore, the group displaying unit 12 displays the same group 21 as that of FIG. 3(a) in the region 91. To the group 22 shown in FIG. 3(a), upper-case letters and lower-case letters belong. When displaying the group 22 shown in FIG. 3(a) in a manner shown in FIG. 15, therefore, the group displaying unit 12 displays the group 22 with the lower-case letters displayed in the region 91 and the upper-case letters displayed in the region 92. To the group 23 shown in FIG. 3(a), only the upper-case letters belong. When displaying the group 22 shown in FIG. 3(a) in a manner shown in FIG. 15, therefore, the group displaying unit 12 displays the same group 23 as that of FIG. 3(a) in the region 92. To the group 24 shown in FIG. 3(a), upper-case letters and numerals belong. When displaying the group 24 shown in FIG. 3(a) in a manner shown in FIG. 15, therefore, the group displaying unit 12 displays the upper-case letters in the region 92 and the numerals in the region 93 to display the group 24.

To the group 21 shown in FIG. 3(b), lower-case letters and upper-case letters belong. When displaying the group 21 shown in FIG. 3(b) in a manner shown in FIG. 16, therefore, the group displaying unit 12 displays the lower-case letters in the region 91 and the upper-case letters in the region 92 to display the group 21. To the groups 22 to 24 shown in FIG. 3(b), lower-case letters, upper-case letters and numerals belong. When displaying the groups 22 to 24 shown in FIG. 3(b) in a manner shown in FIG. 16, therefore, the group displaying unit 12 displays the lower-case letters in the region 91, the upper-case letters in the region 92 and the numerals in the region 93 to display the groups 22 through 24.

While shown in FIG. 15 and FIG. 16 are displays corresponding to FIG. 3(a) and FIG. 3(b), this is also the case with other cases. When a symbol or a control character is included in input candidate characters, the symbol or the control character may be displayed in a region different from those of upper-case letters, lower-case letters and numerals. For displaying a control character, the control character may be represented as a combination of a symbol and a character.

As illustrated in FIG. 15 and FIG. 16, displaying each input candidate character belonging to each group in a different region for each kind of characters enables a user to recognize to which group a desired character belongs with ease and find a group to which the desired character belongs quickly.

While in each of the above-described modes of implementation, the description has been made of a case, as an example, where the input candidate characters are numerals ("0"~"9"), lower-case alphabets ("a"~"z") and upper-case alphabets ("A"~"Z"), symbols may be included in the input candidate characters. For example, "!", "#", "%", "&", "(",")", "=", """, "|", "+", "-", "*", "/", "_", "$" and the like may be included in the input candidate characters. In this case, the first mode of implementation enables input of symbols as well and the second mode of implementation enables collation of passwords including symbols as well. Control character can be also included in input candidate characters. Since control characters indicative of "determination" and "character deletion", for example, may be included in the input candidate characters. In this case, for example, modification of a character string can be made only by four selection keys and notification of end of a character string can be made to the character input device by a user.

Figure 17:
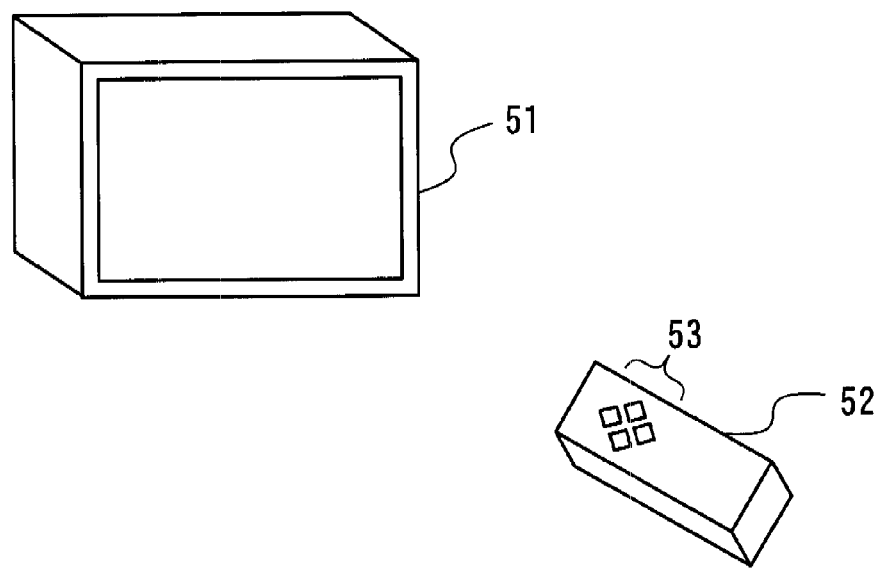
FIG. 17 is a diagram for use in explaining an example of application of the present invention to a Web television receiver.

Next, a specific example to which the present invention is applied will be described. FIG. 17 is a diagram for use in explaining an example of application of the present invention to a Web television receiver. A Web television receiver 51 comprises a display device as the display device 14. The Web television receiver 51 comprises the grouping unit 11, the group displaying unit 12 and the character structuring unit 13. The Web television receiver 51 may comprise the character input management unit 16. The Web television receiver 51 may comprise the collation unit 18 in place of the character structuring unit 13. Each of the units is realized, for example, by a CPU of the Web television receiver 51 which is operable according to a program. When the Web television receiver 51 comprises the collation unit 18, the Web television receiver 51 also comprises the password storage device 19. The input device 15 is realized by a remote controller 52 of the Web television receiver 51. The remote controller 52 has a selection key 53. Such structure realizes the processing described above in the respective modes of implementation.

Figure 18:
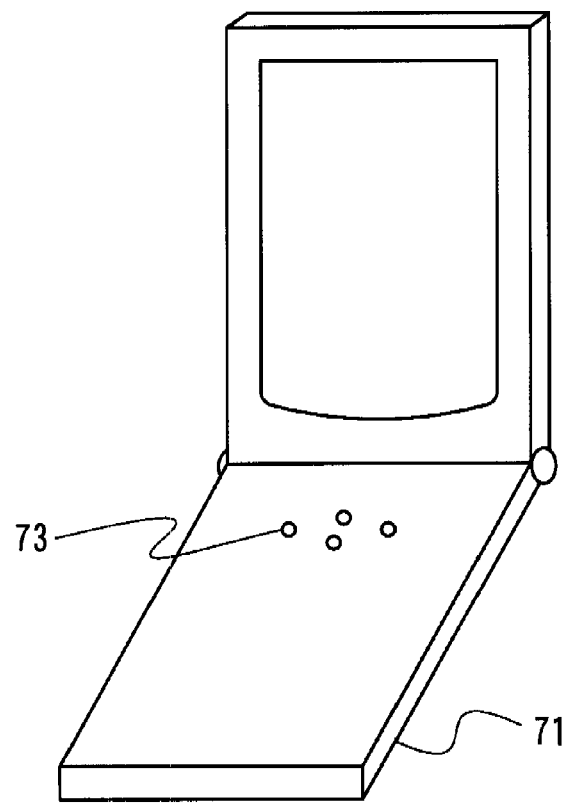
FIG. 18 is a diagram for use in explaining an example of application of the present invention to a cellular phone.

FIG. 18 is a diagram for use in explaining an example of application of the present invention to a cellular phone. A cellular phone 71 comprises a display device as the display device 14. It further comprises a key operation unit as the input device 15, which key operation unit is provided with a selection key 73. The cellular phone 71 comprises the grouping unit 11, the group displaying unit 12 and the character structuring unit 13. The cellular phone 71 may comprise the character input management unit 16. The cellular phone 71 may further comprise the collation unit 18 in place of the character structuring unit 13. Each of these units is realized by a CPU of the cellular phone 71 which is operable under a program. When the cellular phone 71 comprises the collation unit 18, the cellular phone 71 also comprises the password storage device 19. Such a structure realizes the processing described above in the respective modes of implementation. While shown in FIG. 18 is a case where the present invention is applied to a cellular phone, this is also the case with a case where the same is applied to other portable terminal or a terminal device with a display such as an ATM or a terminal at Kiosk.

Figure 19:
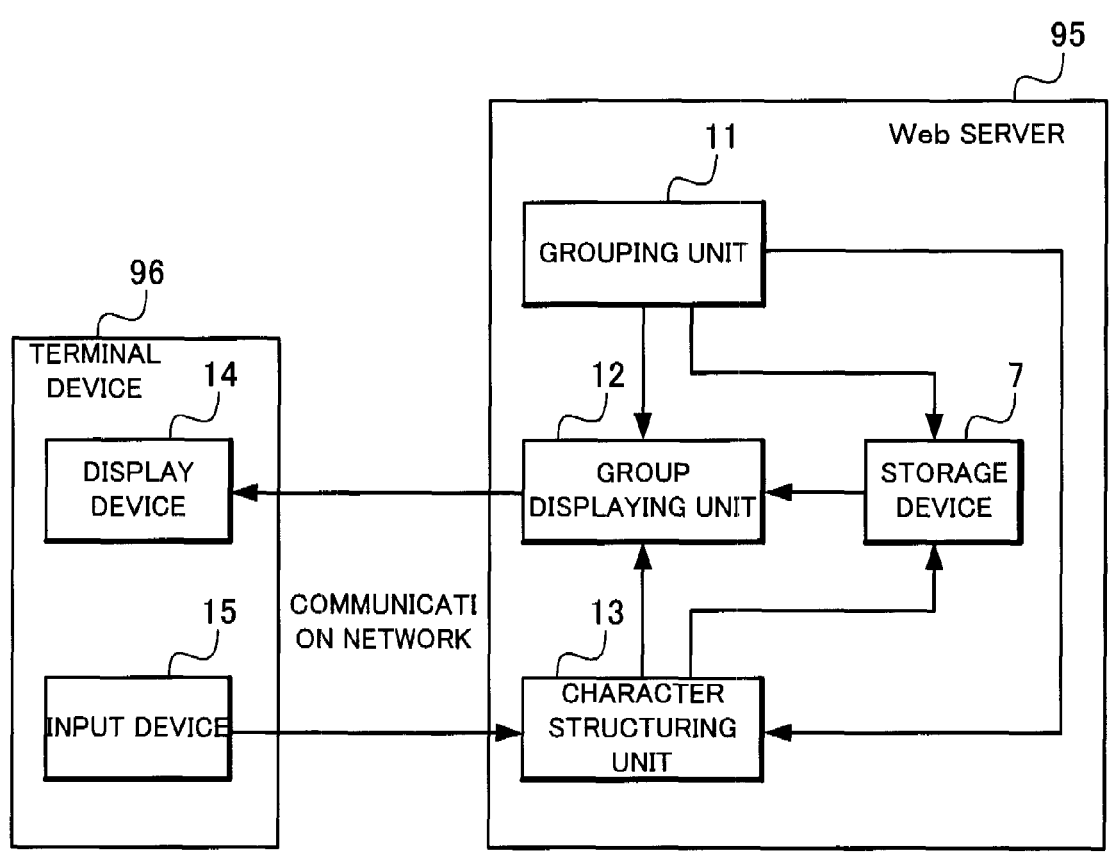
FIG. 19 is a diagram for use in explaining an example of application of the present invention to a terminal device and a Web server connected through a communication network.

On the other hand, FIG. 19 is a diagram for use in explaining an example of application of the present invention to a terminal device and a Web server connected through a communication network. A terminal device 96 comprises a display device as the display device 14 and a key operation unit as the input device 15. A Web server 95 comprises the grouping unit 11, the group displaying unit 12, the character structuring unit 13 and the storage device 7. The Web server 95 may comprise the character input management unit 16. The Web server 95 may further comprise the collation unit 18 in place of the character structuring unit 13. Each of these units is realized by a CPU of the Web server 95 which is operable under a program. When the Web server 95 comprises the collation unit 18, the Web server 95 also comprises the password storage device 19. Such a structure realizes the processing described above in the respective modes of implementation. In the structure shown in FIG. 19, when the grouping unit 11 changes a correspondence relationship between an input candidate character and an m-digit n-ary number on a character basis, even if key operation of the terminal device 96 is stolen at a glance by spy-ware, secrecy of an input character can be kept.

In a structure of a character input system according to the present invention, a grouping unit assigns an m-digit n-ary number satisfying $X \leq n^m$ to each input candidate character on a one-for-one basis to classify each input candidate character into n groups on a basis of each of the m digits and a display unit displays the classified n groups of the respective input candidate characters for each of the m digits. Then, a character specification unit specifies a value which each digit of an n-ary number can assume and which corresponds to a selection unit operated by a user to specify one input candidate character according to an m-digit n-ary number determined by m times of operation of the selection unit. Then, the user only needs to operate the selection unit corresponding to a group to which a desired character or symbol belongs. Accordingly, even when the number of kinds of input candidate characters is increased, it is unnecessary to increase the number n of the selection units of an input unit, so that even when the number n of the selection units of the input unit is small, the number of kinds of the input candidate characters can be increased. In addition, since the user is to select a group, a third person can not specify a user's desired character, so that secrecy of an input character can be kept. Furthermore, since no user will be kept waiting, efficient character input can be realized.

With this structure, a correspondence relationship between each input candidate character and an m-digit n-ary number changes with each one character, so that secrecy of an input character can be enhanced.

With this structure, use of random numbers enables secrecy of character input to be enhanced. Also enabled is detection of an error in operation of the selection unit by a user.

This structure enables an operation error of the selection unit by a user to be detected.

In a case of inputting a number p of characters, it may be structured to execute p times of input for each digit to input the p characters by a total of p×m times of input. More specifically, after urging input of a corresponding first digit of all the characters in such an order as a first digit of a first character, a first digit of a second character, a first digit of a third character . . . a first digit of a p-th character, input of a second digit of all the characters is similarly urged to specify each character after ultimate input of m digits.

With this structure, a user will repeat input of the p characters m times by ordinary operation of one input for one character, which facilitates input while assuming alignment of a character to be input.

With this structure, since each group of input candidate characters is displayed in a different region for each kind of input candidate characters, a user is allowed to quickly find a group to which a desired character belongs.

In other words, such is a case where animation is made such that each input candidate character makes parallel movement to a display position of a subsequent group.

With this structure, as long as a user notes movement of a candidate character to be input, he/she will roughly find its movement destination, which saves labor for searching an input candidate character each time.

With this structure, only by searching a character to be input once, a user is allowed to execute operation of selecting m digits corresponding to a group displayed in proximity to the same.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2006-012297, filed on Jan. 20, 2006, the disclosure of which is incorporated herein in its entirety by reference.

INDUSTRIAL APPLICABILITY

The present invention is applicable to a Web television receiver which receives input of a character or a password by a remote controller, a portable apparatus and a terminal device with a display which receive input of a character and a password, and the like.

The invention claimed is:

1. A character input system, including:
an input unit including an n number (n is an integer satisfying n=>2) of selection units for selecting any group among groups of input candidate characters which are characters or symbols as an input candidate,
a grouping unit for assigning an m-digit n-ary number satisfying $X<=n^m$ when the number of input candidate characters is set to be X (X is an integer satisfying X=>2) to each input candidate character one-for-one to classify the respective input candidate characters into n groups on a basis of each of m (m is an integer satisfying m=>2) digits,
a display unit for displaying, on a basis of each of m digits, the n groups of the respective input candidate characters classified, and
a character specifying unit for specifying a value which each digit of an n-ary number can assume and which corresponds to the selection unit operated by a user and specifying one input candidate character according to an m-digit n-ary number determined by m times of operation of the selection unit.

2. The character input system according to claim 1, wherein said grouping unit changes assignment of an m-digit n-ary number to each input candidate character every time one input candidate character is specified by said character specifying unit to change groups of input candidate characters.

3. The character input system according to claim 1, wherein said grouping unit determines a part or all of values of digits of an m-digit n-ary number by using a random number.

4. The character input system according to claim 1, wherein said grouping unit determines a part of values of digits of an m-digit n-ary number as a value unitarily determined by other digits of the n-ary number.

5. The character input system according to claim 1, wherein said displaying unit displays a group of the respective input candidate characters in a different region for each kind of input candidate characters.

6. The character input system according to claim 1, wherein said displaying unit executes displaying to suggest a subsequent group for each candidate character at the time of switching the display of groups of input candidate characters on a digit basis.

7. The character input system according to claim 1 wherein with a position of each input candidate character fixed, said displaying unit displays a group to which each character belongs in proximity to the character position.

8. A character input system, including:
an input unit including an n (n is an integer satisfying n=>2) number of selection units for selecting any group among groups of input candidate characters which are characters or symbols as an input candidate,
a grouping unit for assigning an m-digit n-ary number satisfying $X<=n^m$ when the number of kinds of input candidate characters is set to be X (X is an integer satisfying X=>2) to each kinds of input candidate character one-for-one to classify the respective kinds of input candidate characters into n groups on a basis of each of m (m is an integer satisfying m=>2) digits, a display unit for displaying, on a basis of each of m digits, the n groups of the respective kinds of input candidate characters classified, and a character specifying unit for specifying n-ary numbers of the X input candidate characters being the character string of p number of characters on a digit basis according to p times of operation corresponding to the number of characters of the character string of input candidate characters by the selection unit that specifies a value which each digit of an n-ary number can assume and specifying X input candidate characters being the character string of p number of characters determined by m times of repetition of specification on a digit basis.

9. A character input system connected to a terminal device through a communication network, the device having an input unit including an n (n is an integer satisfying n=>2) number of selection units for selecting any group among groups of input candidate
characters which are characters or symbols as an input candidate and a display device for displaying an image, comprising:

a grouping unit for assigning an m-digit n-ary number satisfying $X \leq n^m$ when the number of input candidate characters is set to be X (X is an integer satisfying X=>2) to each input candidate character one-for-one to classify the respective input candidate characters into n groups on a basis of each of m (m is an integer satisfying m=>2) digits, a display unit for causing said display device to display, on a basis of each of m digits, the n groups of the respective input candidate characters classified, and a character specifying unit for specifying a value which each digit of an n-ary number can assume and which corresponds to the selection unit operated by a user and specifying one input candidate character according to an m-digit n-ary number determined by m times of operation of the selection unit.

10. A character input method using an input unit including an n (n is an integer satisfying n=>2) number of selection units, wherein a grouping unit assigns an m-digit n-ary number satisfying $X \leq n^m$ when the number of input candidate characters which are characters or symbols as an input candidate is set to be X (X is an integer satisfying S=>2) to each input candidate character one-for-one to classify the respective input candidate characters into n groups on a basis of each of m (m is an integer satisfying m=>2) digits, a display unit displays, on a basis of each of the m digit, the n groups of the respective input candidate characters classified, and a character specifying unit specifies a value which each digit of an n-ary number can assume and which corresponds to the selection unit operated by a user and specifies one input candidate character according to an m-digit n-ary number determined by m times of operation of the selection unit.

11. A character input program for causing a computer integrally or separately provided with an input unit including an n (n is an integer satisfying n=>2) number of selection units to execute:

grouping processing of assigning an m-digit n-ary number satisfying X<=nm when the number of input candidate characters which are characters or symbols as an input candidate is set to be X (X is an integer satisfying X=>2) to each input candidate character one-for-one to classify the respective input candidate characters into n groups on a basis of each of m (m is an integer satisfying m=>2) digits, displaying processing of displaying, on a basis of each of the m digit, the n groups of the respective input candidate characters classified, and character specifying processing of specifying a value which each digit of an n-ary number can assume and which corresponds to the selection unit operated by a user and specifying one input candidate character according to an m-digit n-ary number determined by m times of operation of the selection unit.

12. The character input program according to claim 11, which causes a computer to execute grouping processing of changing assignment of an m-digit n-ary number to each input candidate character every time one input candidate character is specified by the character specifying processing to change groups of input candidate characters.

13. The character input program according to claim 11, which causes a computer to execute grouping processing of determining a part or all of values of digits of an m-digit n-ary number by using a random number.

14. The character input program according to claim 11, which causes a computer to execute grouping processing of determining a part of values of digits of an m-digit n-ary number as a value unitarily determined by other digits of the n-ary number.

15. The character input program according to claim 11, which causes a computer to execute displaying processing of displaying a group of the respective input candidate characters in a different region for each kind of input candidate characters.

* * * * *

UNITED STATES PATENT AND TRADEMARK OFFICE
CERTIFICATE OF CORRECTION

| | | |
|---|---|---|
| PATENT NO. | : 8,339,357 B2 | Page 1 of 1 |
| APPLICATION NO. | : 12/161564 | |
| DATED | : December 25, 2012 | |
| INVENTOR(S) | : Senda | |

It is certified that error appears in the above-identified patent and that said Letters Patent is hereby corrected as shown below:

In the Specification

Column 5, Line 60: Delete "$X \leq n^m$" and insert -- $X \leq n^m$ --

Column 15, Line 30: Delete "mariner" and insert -- manner --

Column 27, Line 18: Delete "516." and insert -- S16. --

Signed and Sealed this
Twenty-first Day of October, 2014

Michelle K. Lee
*Deputy Director of the United States Patent and Trademark Office*